United States Patent
Chen et al.

(10) Patent No.: US 12,440,699 B2
(45) Date of Patent: Oct. 14, 2025

(54) PHOTOTHERAPY DEVICE AND PHOTOTHERAPY INSTRUMENT USED FOR IRRADIATION OF THE HEAD, AND THERAPY METHOD THEREOF

(71) Applicant: ZHEJIANG BRAINHEALTH MEDICAL TECHNOLOGY CO., LTD., Hangzhou (CN)

(72) Inventors: Liang Chen, Haining (CN); Xunbin Wei, Haining (CN); Qingqiang Meng, Haining (CN); Yuanzhen Suo, Haining (CN); Jing Yu, Haining (CN); Min Xie, Haining (CN); Bo Zhou, Haining (CN); Qiyuan Zhuang, Haining (CN); Lechan Tao, Haining (CN); Yong Huang, Haining (CN)

(73) Assignee: ZHEJIANG BRAINHEALTH MEDICAL TECHNOLOGY CO., LTD., Hangzhou (CN)

( * ) Notice: Subject to any disclaimer, the term of this patent is extended or adjusted under 35 U.S.C. 154(b) by 392 days.

(21) Appl. No.: 17/620,403

(22) PCT Filed: Jun. 16, 2020

(86) PCT No.: PCT/CN2020/096249
§ 371 (c)(1),
(2) Date: Dec. 17, 2021

(87) PCT Pub. No.: WO2020/173512
PCT Pub. Date: Sep. 3, 2020

(65) Prior Publication Data
US 2022/0362576 A1    Nov. 17, 2022

(30) Foreign Application Priority Data
Jun. 17, 2019 (CN) .......................... 201910522271.6

(51) Int. Cl.
A61N 5/06 (2006.01)

(52) U.S. Cl.
CPC .... *A61N 5/0618* (2013.01); *A61N 2005/0647* (2013.01); *A61N 2005/0652* (2013.01); *A61N 2005/0659* (2013.01)

(58) Field of Classification Search
None
See application file for complete search history.

(56) References Cited

U.S. PATENT DOCUMENTS

| 7,534,255 B1 | 5/2009 | Streeter et al. |
| 2004/0122492 A1* | 6/2004 | Harth .................. A61N 5/0616 607/90 |

(Continued)

FOREIGN PATENT DOCUMENTS

| CN | 105126256 A | 12/2015 |
| CN | 106413810 A | 2/2017 |

(Continued)

OTHER PUBLICATIONS

Ismail R, Hansen AK, Parbo P, Brændgaard H, Gottrup H, Brooks DJ, Borghammer P. The Effect of 40-Hz Light Therapy on Amyloid Load in Patients with Prodromal and Clinical Alzheimer's Disease. Int J Alzheimers Dis. Jul. 30, 2018;2018 (Year: 2018).*

(Continued)

*Primary Examiner* — Amanda K Hulbert
(74) *Attorney, Agent, or Firm* — Lando & Anastasi, LLP

(57) ABSTRACT

A phototherapy device (100) and a phototherapy instrument (500), comprising a near infrared irradiation module (110) used for emitting near infrared light to the head, and a control component (120) used for controlling the operation of the near infrared irradiation module (110) and coupled to the near infrared irradiation module (110). A method for using near infrared light for therapy, which comprises apply- (Continued)

ing a first, optional second, optional third or more near infrared lights to the head of a patient. The device and method are used for treating Alzheimer's disease, improving brain mitochondrial function and ATP levels, promoting amyloid beta protein (Aβ) decomposition, reducing Aβ deposition, reducing damage to nerve cells, improving nerve tissue repair and regeneration capabilities, improving cognitive ability etc. A therapy method using the phototherapy device (100) or the phototherapy instrument (500), and a computer readable recording medium controlling required near infrared light.

26 Claims, 10 Drawing Sheets

(56) References Cited

U.S. PATENT DOCUMENTS

| | | | |
|---|---|---|---|
| 2008/0269849 A1* | 10/2008 | Lewis | A61N 5/0613 607/91 |
| 2009/0254154 A1* | 10/2009 | De Taboada | A61N 5/0613 607/110 |
| 2010/0204762 A1 | 8/2010 | De Taboada et al. | |
| 2011/0015707 A1* | 1/2011 | Tucker | A61N 5/0617 607/90 |
| 2012/0046716 A1* | 2/2012 | Dougal | A61N 5/0613 607/91 |
| 2015/0297914 A1* | 10/2015 | Hamid | A61N 5/0617 607/89 |
| 2016/0067087 A1 | 3/2016 | Tedford et al. | |

FOREIGN PATENT DOCUMENTS

| | | |
|---|---|---|
| CN | 107072821 A | 8/2017 |
| CN | 107185113 A | 9/2017 |
| WO | 2016040534 A1 | 3/2016 |
| WO | 2019074637 A1 | 4/2019 |

OTHER PUBLICATIONS

Hamblin MR. Shining light on the head: Photobiomodulation for brain disorders. BBA Clin. Oct. 1, 2016;6:113-124. doi: 10.1016/j.bbacli.2016.09.002. PMID: 27752476; Pmcid: PMC5066074. (Year: 2016).*

Hamblin MR. Photobiomodulation for Alzheimer's Disease: Has the Light Dawned? Photonics. Sep. 2019;6(3):77. doi: 10.3390/photonics6030077. Epub Jul. 4, 2019. PMID: 31363464; PMCID: PMC6664299. (Year: 2019).*

Berman et al., "Photobiomodulation with Near Infrared Light Helmet in a Pilot, Placebo Controlled Clinical Trial in Dementia Patients Testing Memory and Cognition," J Neurol Neurosci (2017) vol. 8, No. 1, Article 176, 8 pages.

Saltmarche et al., "Significant Improvement in Cognition in Mild to Moderately severe Dementia Cases Treated with Transcranial Plus Intranasal Photobiomodulation: Case Series Report," Photomedicine and Laser Surgery (2017) vol. 35 No. 8, pp. 432-441.

Hamblin, "Photobiomodulation for Traumatic Brain Injury and Stroke," J Neuro Res (2017) 13 pages.

International Search Report and Written Opinion issued in PCT/CN2020/096249, mailed Sep. 18, 2020.

Tao et al., "Near infra-red light treatment of Alzheimer's disease," Proc SPIE (2019) Biophotonics and Immune Responses XIV, vol. 10879, Article 108791A-2, 7 pages.

Han et al., "Near infra-red light treatment of Alzheimer's disease," Journal of Innovative Optical Health Sciences (2017) vol. 11, No. 1, Article 1750012, 8 pages.

Wang et al., "A light therapy for treating Alzheimer's disease," Proc of SPIE, Biophotonics and Immune Responses XII (2017) vol. 10065, Article 1006510, 6 pages.

Rosen et al., "A New Rating Scale for Alzheimer's Disease," Am J Psychiatry (1984) vol. 141, No. 11, pp. 1356-1364.

Iaccarino et al., "Gamma frequency entrainment attenuates amyloid load and modifies microglia," Nature (2016) vol. 540, pp. 230-235.

* cited by examiner (a)

(b)

(a)

(b)

PHOTOTHERAPY DEVICE AND PHOTOTHERAPY INSTRUMENT USED FOR IRRADIATION OF THE HEAD, AND THERAPY METHOD THEREOF

CROSS-REFERENCE TO RELATED APPLICATIONS

This application is a US national application of International Application No. PCT/CN/2020/096249 filed on Jun. 16, 2020, which claims priority of CN application Serial No. 201910522271.6 filed on Jun. 17, 2019, the disclosures of which are hereby incorporated by reference in their entirety.

FIELD OF THE INVENTION

The present invention relates to a medical devices, and in particular to a phototherapy device and a phototherapy instrument used for head irradiation. In addition, the present invention also relates to a method of treating disease, and in particular to a method of using near-infrared light to treat Alzheimer's disease.

BACKGROUND OF THE INVENTION

Alzheimer's disease (AD) is commonly known as Senile Dementia, which has slow progress of onset and gets worse over time, with impaired short-term memory as early symptoms. As the disease progresses, language dysfunction, emotional instability, difficulty in self-care, abnormal behavior, etc. may occur, which will eventually lead to loss of physical function and death. The cause of Alzheimer's disease is still unknown, and the main pathological features thereof are amyloid beta protein (Aβ) plaque deposition, Tau protein fibrillar tangle, synapses and neuronal cell death. Alzheimer's disease occurs in about 6% of the elderly over the age of 65, and in some patients before the age of 65. With the increase of the life expectancy and the aging of the population, the number of Alzheimer patients is increasing in the world and in China, which has brought huge social and economic burden.

No clinically effective treatment is currently available for AD. The existing clinical methods mainly try to delay the progression of dementia through drugs, but the treatment effect is poor. So far, no drug has been proven to prevent the progression of AD. Existing therapeutic drugs, such as cholinesterase inhibitors (donepezil) and NMDA receptor antagonists (memantine), can improve some symptoms of patients in early stages of the disease, but cannot prevent the progression of the disease, and have greater side effects on some patients.

In recent years, studies for treating Alzheimer's disease using physical factors, such as transcranial direct current stimulation and transcranial magnetic therapy, etc., have been started in China and abroad. However, the therapeutic effect of the transcranial direct current stimulation and transcranial magnetic therapy can only reach cerebral cortex, can't reach the deep brain regions involved in some functional networks, such as the inner side of prefrontal lobe, the insular lobe, the cingulate gyrus and the like. Moreover, repeated transcranial magnetic stimulation may cause epilepsy and lead to potential harm to the human body.

SUMMARY OF THE INVENTION

Near-infrared light can reach a brain to a depth of 5 cm when illuminating a head, and light of certain wavelengths can even reach deeper areas. Moreover, side effects of infrared therapy are small. Therefore, the use of near-infrared light to treat Alzheimer's disease has become one of international leading-edge research subjects. But until now there is no clear research results, and no satisfactory therapeutic effect has been obtained.

In order to solve the above problems, the inventors proposed the present invention. More specifically, the present invention is a phototherapy device for head irradiation, including a near-infrared irradiation module configured for emitting near-infrared light to a head, and a control component configured for controlling the operation of the near-infrared irradiation module and coupled with the near-infrared irradiation module. In addition, the present invention also relates to a method of treating Alaneimer's disease using near-infrared light, comprising administering a first, optionally a second, optionally a third or more near-infrared lights to the head of a patient.

In a first aspect, the present invention provides a phototherapy device for head irradiation, including a near-infrared irradiation module configured for emitting near-infrared light to a head; and a control component, which is coupled with the near-infrared irradiation module, and configured for controlling the operation of the near-infrared irradiation module.

In a more specific embodiment of this aspect, the near-infrared irradiation module emits a predetermined wavelength of near-infrared light, and the control component controls the near-infrared irradiation module to operate in a pulsed light irradiation mode.

In a more specific embodiment of this aspect, the pulsed light irradiation mode operates at a frequency of 1-100 Hz, preferably 8-50 Hz, preferably 10 Hz or 40 Hz.

In a more specific embodiment of this aspect, the near-infrared irradiation module emits near-infrared light with a central wavelength value of about 700-1200 nm, preferably, the central wavelength of the near-infrared light is about 1020-1120 nm, preferably about 1070 nm; preferably, the central wavelength of the near-infrared light is about 760-860 nm, preferably about 810 nm.

In a second aspect, the present invention provides a phototherapy instrument for head irradiation, including: a housing adapted to the shape of a human head; a near-infrared irradiation module arranged in the housing for emitting near-infrared light to the head; a control component, which is coupled with the near-infrared irradiation module, and configured for controlling the operation of the near-infrared irradiation module.

In a more specific embodiment of this aspect, the housing includes a top cover, a movable component located under the top cover and fixedly connected to the top cover, the phototherapy instrument includes multiple near-infrared irradiation modules which are arranged in the top cover and/or the movable component, and the movable component adjusts the distances between the near-infrared irradiation modules and a user's head.

In a more specific embodiment of this aspect, the phototherapy instrument further includes an input component for receiving operating parameters input by the user and providing the operating parameters to the control component.

In a more specific embodiment of this aspect, the operating parameter includes at least one of irradiation time, irradiation mode, irradiation intensity, and pulse frequency of near-infrared light.

In a more specific embodiment of this aspect, the therapy instrument further includes a console and a mechanical arm provided on the console, the input component is provided on the console, and the mechanical arm is connected to the housing to control the omnidirectional movement of the housing.

In a third aspect, the present invention provides a method of treatment using near-infrared light, which includes applying a first near-infrared light having a central wavelength of about 700-1200 nm to a patient's head, and optionally, applying a second near-infrared light having a central wavelength of about 700-1200 nm to the patient's head, and optionally, applying a third or more near-infrared light having a central wavelength of about 700-1200 nm to the patient's head; preferably, the central wavelength of the first near-infrared light is about 1020-1120 nm, preferably about 1070 nm; preferably, the central wavelength of the second near-infrared light is about 760-860 nm, preferably about 810 nm.

In a more specific embodiment of this aspect, the first near-infrared light, and/or the second near-infrared light, and/or the third near-infrared light or more near-infrared light are applied simultaneously or alternately.

In a more specific embodiment of this aspect, the first near-infrared light, and/or the second near-infrared light, and/or the third near-infrared light or more near-infrared light have a pulse frequency of about 1-100 Hz, preferably 8-50 Hz, preferably with a duty cycle of about 50%; preferably, the first, second, third or more near-infrared light has a pulse frequency of about 8-12 Hz; preferably, the first, second, third or more near-infrared light has a pulse frequency of about 10 Hz; preferably, the first, second, third or more near-infrared light has a pulse frequency of about 38-42 Hz; preferably, the first, second, third or more near-infrared light has a pulse frequency of about 40 Hz.

In a fourth aspect, the present invention provides a method of treatment using near-infrared light, which includes applying near-infrared light having a pulse frequency of about 1-100 Hz, preferably 8-50 Hz to a patient's head; optionally, the near-infrared light has a duty cycle of about 50%; optionally, the near-infrared light has a central wavelength of about 700-1200 nm; preferably, the near-infrared light has a pulse frequency of about 8-12 Hz; preferably, the near-infrared light has a pulse frequency of about 10 Hz; preferably, the near-infrared light has a pulse frequency of about 38-42 Hz; preferably, the near-infrared light has a pulse frequency of about 40 Hz; preferably, the central wavelength of the near-infrared light is about 1020-1120 nm, preferably about 1070 nm; preferably, the central wavelength of the near-infrared light is about 760-860 nm, preferably about 810 nm.

In a more specific embodiment of this aspect, the method further includes applying the second near-infrared light having a pulse frequency of about 1-100 Hz, preferably 8-50 Hz to the patient's head; preferably, the near-infrared light has a duty cycle of about 50%; preferably, the near-infrared light has a central wavelength of about 700-1200 nm; optionally, the second near-infrared light is applied simultaneously or alternately with the first near-infrared light; preferably, the second near-infrared light has a pulse frequency of about 8-12 Hz; preferably, the second near-infrared light has a pulse frequency of about 10 Hz; preferably, the second near-infrared light has a pulse frequency of about 38-42 Hz; preferably, the second near-infrared light has a pulse frequency of about 40 Hz; preferably, the central wavelengths of the first and second near-infrared lights are selected from about 760-860 nm and 1020-1120 nm, preferably about 810 nm and 1070 nm.

In a more specific embodiment of this aspect, the method further includes applying the third or more near-infrared light having a pulse frequency of about 1-100 Hz, preferably 8-50 Hz to the patient's head; preferably, the near-infrared light has a duty cycle of about 50%; preferably, the near-infrared light has a central wavelength of about 700-1200 nm; optionally, the third or more near-infrared light is applied simultaneously or alternately with the second near-infrared light and/or the first near-infrared light.

In a fifth aspect, the present invention provides a treatment method, comprising administering an anti-Alzheimer's disease drug and/or anti-Alzheimer's disease physical therapy to a patient, and applying near-infrared light to the patient's head; optionally, the central wavelength of the near-infrared light is about 700-1200 nm; preferably, the central wavelength of the near-infrared light is about 1020-1120 nm, preferably about 1070 nm; preferably, the central wavelength of the near-infrared light is about 760-860 nm, or preferably about 810 nm.

In a more specific embodiment of this aspect, the method further includes applying the second near-infrared light having a central wavelength of about 700-1200 nm to the patient's head; optionally, the second near-infrared light is applied simultaneously or alternately with the first near-infrared light; preferably, the central wavelength of the second near-infrared light is about 760-860 nm, preferably about 810 nm.

In a more specific embodiment of this aspect, the method further includes applying the third or more near-infrared light having a central wavelength of about 700-1200 nm to the patient's head; optionally, the third or more near-infrared light is applied simultaneously or alternately with the second near-infrared light and/or the first near-infrared light.

In a more specific embodiment of this aspect, the first, optionally second, optionally third or more near-infrared light of the method has a pulse frequency of about 1-100 Hz, preferably 8-50 Hz, preferably with a duty cycle of about 50%; preferably, the first, optionally second, optionally third or more near-infrared light has a pulse frequency of about 8-12 Hz; preferably, the first, optionally second, optionally third or more near-infrared light has a pulse frequency of about 10 Hz; preferably, the first, optionally second, optionally third or more near-infrared light has a pulse frequency of about 38-42 Hz; preferably, the first, optionally second, optionally third or more near-infrared light has a pulse frequency of about 40 Hz.

In a sixth aspect, the present invention provides a treatment method, which includes administering an anti-Alzheimer's disease drug and/or anti-Alzheimer's disease physical therapy to a patient, and applying near-infrared light to the patient's head.

In a more specific embodiment of this aspect, the near-infrared light has a pulse frequency of about 1-100 Hz, preferably 8-50 Hz, optionally with a duty cycle of about 50%; optionally, the near-infrared light has a central wavelength of about 700-1200 nm; preferably, the near-infrared light has a pulse frequency of about 8-12 Hz; preferably, the near-infrared light has a pulse frequency of about 10 Hz; preferably, the near-infrared light has a pulse frequency of about 38-42 Hz; preferably, the near-infrared light has a pulse frequency of about 40 Hz; preferably, the central wavelength of the near-infrared light is about 1020-1120 nm, or preferably about 1070 nm; preferably, the central wavelength of the near-infrared light is about 760-860 nm, preferably about 810 nm.

In a more specific embodiment of this aspect, the method further includes applying the second near-infrared light having a pulse frequency of about 1-100 Hz, preferably 8-50 Hz to the patient's head; preferably, the near-infrared light has a duty cycle of about 50%; preferably, the near-infrared light has a central wavelength of about 700-1200 nm; optionally, the second near-infrared light is applied simultaneously or alternately with the first near-infrared light; preferably, the second near-infrared light has a pulse frequency of about 8-12 Hz; preferably, the second near-infrared light has a pulse frequency of about 10 Hz; preferably, the second near-infrared light has a pulse frequency of about 38-42 Hz; preferably, the second near-infrared light has a pulse frequency of about 40 Hz; preferably, the central wavelengths of the first and second near-infrared lights are selected from about 760-860 nm and 1020-1120 nm, or preferably about 810 nm and 1070 nm.

In a more specific embodiment of this aspect, the method further includes applying the third or more near-infrared light having a pulse frequency of about 1-100 Hz, preferably 8-50 Hz to the patient's head; preferably, the near-infrared light has a duty cycle of about 50%; preferably, the near-infrared light has a central wavelength of about 700-1200 nm; optionally, the third or more near-infrared light is applied simultaneously or alternately with the second near-infrared light and/or the first near-infrared light.

In a seventh aspect, the present invention provides a computer readable recording medium, on which is recorded an executable code segment, which is used to achieve the following function when executed: controlling multiple light-emitting devices of near-infrared light-emitting diode and/or laser diode to apply a first near-infrared light with a central wavelength of about 700-1200 nm to a patient's head; preferably, the central wavelength of the first near-infrared light is about 1020-1120 nm, preferably about 1070 nm; preferably, the central wavelength of the first near-infrared light is about 760-860 nm, or preferably about 810 nm.

In a more specific embodiment of this aspect, the code segment is also used to achieve the following function when executed: controlling multiple light-emitting devices of near-infrared light-emitting diode and/or laser diode to apply a second near-infrared light with a central wavelength of about 700-1200 nm to the patient's head, wherein the second near-infrared light is applied simultaneously or alternately with the first near-infrared light; preferably, the central wavelengths of the first and second near-infrared lights are selected from about 760-860 nm and 1020-1120 nm, preferably about 810 nm and 1070 nm.

In a more specific embodiment of this aspect, the code segment is also used to achieve the following function when executed: controlling multiple light-emitting devices of near-infrared light-emitting diode and/or laser diode to apply a third or more near-infrared light with a central wavelength of about 700-1200 nm to the patient's head, wherein the third or more near-infrared light is applied simultaneously or alternately with the second near-infrared light and/or the first near-infrared light.

In a more specific embodiment of this aspect, the first, second, and third or more near-infrared lights have a pulse frequency of about 1-100 Hz, preferably 8-50 Hz; preferably, the first, second, and third or more near-infrared lights have a pulse frequency of about 8-12 Hz; preferably, the first, second, and third or more near-infrared lights have a pulse frequency of about 10 Hz; preferably, the first, second, and third or more near-infrared lights have a pulse frequency of about 38-42 Hz; preferably, the first, second, and third or more near-infrared lights have a pulse frequency of about 40 Hz.

In an eighth aspect, the present invention provides a computer readable recording medium, on which is recorded an executable code segment, which is used to achieve the following function when executed: controlling multiple light-emitting devices of near-infrared light-emitting diode and/or laser diode to apply near-infrared light with a pulse frequency of about 1-100 Hz, preferably 8-50 Hz to a patient's head; preferably, the near-infrared light has a pulse frequency of about 8-12 Hz; preferably, the near-infrared light has a pulse frequency of about 10 Hz; preferably, the near-infrared light has a pulse frequency of about 38-42 Hz; preferably, the near-infrared light has a pulse frequency of about 40 Hz.

In a more specific embodiment of this aspect, the near-infrared light has a duty cycle of about 50%.

In a more specific embodiment of this aspect, the near-infrared light has a central wavelength of about 700-1200 nm; preferably, the central wavelength of the near-infrared light is about 1020-1120 nm, preferably about 1070 nm; preferably, the central wavelength of the near-infrared light is about 760-860 nm, preferably about 810 nm; preferably, the central wavelength of the near-infrared light is about 1020-1120 nm, or preferably about 1070 nm.

In a more specific embodiment of this aspect, the code segment is also used to achieve the following function when executed: applying a second near-infrared light with a pulse frequency of about 1-100 Hz, preferably 8-50 Hz, to the patient's head; wehrein the near-infrared light has a duty cycle of about 50%; the near-infrared light has a central wavelength of about 700-1200 nm; the second near-infrared light is applied simultaneously or alternately with the first near-infrared light; preferably, the second near-infrared light has a pulse frequency of about 8-12 Hz; preferably, the second near-infrared light has a pulse frequency of about 10 Hz; preferably, the second near-infrared light has a pulse frequency of about 38-42 Hz; preferably, the second near-infrared light has a pulse frequency of about 40 Hz; preferably, the central wavelengths of the first and second near-infrared lights are selected from about 760-860 nm and 1020-1120 nm, preferably about 810 nm and 1070 nm.

In a more specific embodiment of this aspect, the code segment is also used to achieve the following function when executed: applying the third or more near-infrared light having a pulse frequency of about 1-100 Hz, preferably 8-50 Hz, to the patient's head; the near-infrared light has a duty cycle of about 50%; the near-infrared light has a central wavelength of about 700-1200 nm; and the third or more near-infrared light is applied simultaneously or alternately with the second near-infrared light and/or the first near-infrared light.

BRIEF DESCRIPTION OF THE DRAWINGS

Through a more detailed description of embodiments of the present invention in conjunction with the accompanying drawings, the above and other objectives, features and advantages of the present invention will become more apparent. The accompanying drawings are used to provide a further understanding of the embodiments of the present invention, and constitute a part of the specification, which together with the embodiments of the present invention, are used to explain the present invention rather than to constitute a limitation to the present invention. In the drawings, the same reference numerals generally represent the same components or steps.

DETAILED DESCRIPTION OF THE INVENTION

Figure 1:
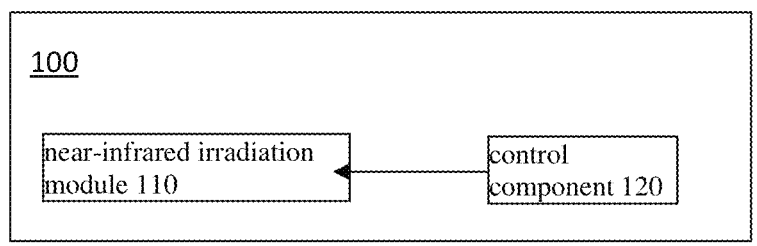
FIG. 1 is a schematic view of the functional structure of a phototherapy device for head irradiation according to an embodiment of the present invention.

The R&D team of the applicant pays attention to the treatment of AD and related diseases for a long time. After consulting a large number of related literatures, through in-depth research on the physical properties of near-infrared light (NIR) and its interaction with cells, we theoretically demonstrated feasibility of a phototherapy instrument for Alzheimer's disease, and proposed to use a specific near-infrared spectroscopy mode to act on human nerve cells for improving the function of mitochondria in nerve cells, promoting Aβ decomposition, and reducing damage to nerve cells, while increasing repair and regeneration abilities of nerve tissues.

On this basis, the R&D team organized related experiments using a specific near-infrared spectroscopy mode to act on AD model mice. The animal experiments showed that this specific near-infrared spectroscopy mode may reduce amyloid-like plaques in cerebral cortex of AD model mice, and improve cognitive ability of the mice, thereby providing experimental support for the feasibility of the product and method of the present invention.

Specifically, the present invention, by irradiating a human's head with a specific infrared spectroscopy mode, increases brain mitochondrial function and ATP level, promotes the decomposition of amyloid beta protein (Aβ) in the brain of AD patients, and reduces Aβ deposition, thereby reducing damage to nerve cells, increasing repair and regeneration abilities of nerve tissues, and ultimately delaying the progression of AD patients and improving the cognitive function of the patients.

More specifically, the phototherapy device and treatment method of the present invention have the following technical characteristics:

Wavelength

The inventors have found that the use of specific wavelengths for irradiation is critical for the treatment of AD and related diseases. In the device and method of the present invention, near-infrared light is used, especially near-infrared light with a central wavelength in the range of about 700 nm to about 1100 nm.

In one specific embodiment, the central wavelength of the near-infrared light is about 1020-1120 nm, preferably about 1070 nm; in another specific embodiment, the central wavelength of the near-infrared light is about 760-860 nm, preferably about 810 nm. In one specific embodiment, the device and method of the present invention use near-infrared light with a central wavelength of about 810 nm, 880 nm, 950 nm, 1040 nm, or 1070 nm.

Multi-Wavelength

The inventors have also found that the effect of irradiation with multiple wavelengths is better than that of irradiation with a single-wavelength. Therefore, in a preferred embodiment, the device and method of the present invention use multiple wavelengths of near-infrared light to treat patients.

In one specific embodiment, the device and method of the present invention use two wavelengths of near-infrared light which includes a first and second near-infrared lights. The first near-infrared light has a central wavelength of about 700-1200 nm, and the second near-infrared light has a central wavelength of about 700-1200 nm. In another specific embodiment, the device and method of the present invention use two wavelengths of near-infrared light having central wavelengths of 1020-1120 nm (preferably about 1070 nm) and 760-860 nm (preferably about 810 nm), respectively.

In another specific embodiment, the device and method of the present invention use three or more wavelengths of near-infrared light, wherein the first near-infrared light has a central wavelength of about 700-1200 nm, the second near-infrared light has a center wavelength of about 700-1200 nm, and the third or more near-infrared light has a central wavelength of about 700-1200 nm.

In another specific embodiment, when multi-wavelength therapy is used, the near-infrared light of various wavelengths can be applied simultaneously or alternately. For example, when two near-infrared lights are used for therapy, the first near-infrared light may be applied simultaneously or alternately with the second near-infrared light. For another example, when three or more near-infrared lights are used for therapy, the first near-infrared light may be applied simultaneously or alternately with the second near-infrared light; the first near-infrared light may be applied simultaneously or alternately with the third or more near-infrared light; and the second near-infrared light may be applied simultaneously or alternately with the third or more near-infrared light.

Pulse Frequency

The inventors have also found that the effect of pulse frequency irradiation with near-infrared light is better than that of continuous irradiation with near-infrared light. Therefore, in an preferred technical solution, the device and method of the present invention use near-infrared light with pulse frequency to treat patients.

In one specific embodiment, the device and method of the present invention use near-infrared light having a pulse frequency of about 1-100 Hz, or preferably 8-50 Hz. In another specific embodiment, the near-infrared light has a duty cycle of about 50%. In another specific embodiment, the near-infrared light has a central wavelength of about 700-1200 nm.

In another specific embodiment, the device and method of the present invention use a pulse frequency of about 8-12 Hz, preferably, a pulse frequency of about 10 Hz.

In another specific embodiment, the device and method of the present invention use a pulse frequency of about 38-42 Hz, preferably, a pulse frequency of about 40 Hz.

Irradiation Dose

In the device and method of the present invention, the irradiation dose of near-infrared light must not only achieve the therapeutic effect, but also ensure that the patient is not harmed.

Regarding the time of irradiation, considering that the mood of AD patients is prone to fluctuate, one irradiation cannot last too long; therefore, the recommended therapeutic scheme is 10 minutes each irradiation, once a day; preferably, the time of irradiation is 10 minutes each time, once a day, 5 days a week; of course, longer or shorter time of irradiation may also be applied as appropriate.

Regarding the intensity of irradiation, the irradiation module of the phototherapy device of the present invention uses low-power LEDs to generate near-infrared light with low light power, which belongs to Class I risk (low risk) level classified according to the hazard level of the GB/T 20145-2006 "Photobiological Safety of Lamps and Lamp Systems" standard, and thus has high safety. Through analysis of risk, we believe that the irradiation intensity is acceptable in terms of risk/benefit.

Light Source

In the device and method of the present invention, the required near-infrared light can be derived from a variety of instruments capable of generating near-infrared light, as long as the irradiation intensity is effective for AD treatment and the upper limit of the irradiation intensity does not cause harm to the human body.

In one specific embodiment, the power density of the applied near-infrared light is 10 mW/cm$^2$ or more, preferably is 35 mW/cm$^2$ or less; in another specific embodiment, the power density of the applied near-infrared light is about 25 mW/cm$^2$.

In another specific embodiment, the near-infrared light is derived from a LED, or preferably from a LED array; preferably, the power of the LED is about 5-30 mW, preferably about 14 mW; preferably, wherein the total power of the LED array is about 500-2000 mW, preferably about 900 mW. In another specific embodiment, the near-infrared light is derived from a laser diode, preferably from a laser diode array.

In another specific embodiment, the irradiation intensity of the light source is fixed and not adjustable. In another specific embodiment, the irradiation intensity of the light source is adjustable.

The technical solutions in the embodiments of the present invention will be clearly and completely described below in conjunction with the accompanying drawings in the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

FIG. 1 is a schematic view of the functional structure of a phototherapy device for head irradiation according to an embodiment of the present invention. The phototherapy device, by irradiating a human's head with a specific infrared spectroscopy mode, can increase brain mitochondrial function and ATP level, promote the decomposition of amyloid beta protein (Aβ) in the brain of AD patients, and reduce Aβ deposition, thereby reducing damage to nerve cells, increasing repair and regeneration abilities of nerve tissues, and ultimately delaying the progression of AD patients and improving the cognitive function of the patients.

As shown in FIG. 1, the phototherapy device 100 according to an embodiment of the present invention includes near-infrared irradiation module 110 and control component 120. The near-infrared irradiation module 110 is used to emit near-infrared light to the head, and the control component 120 is coupled with the near-infrared irradiation module 110 to control the wavelength, working mode, pulse frequency, etc. of the near-infrared light emitted by the near-infrared irradiation module 110, thereby controlling the operation of the near-infrared irradiation module 110.

The control component 120 can control the near-infrared light irradiation module 110 to operate in a continuous light irradiation mode. For example, the near-infrared irradiation module 110 could emit near-infrared light with a central wavelength of 700 nm-1100 nm and continuously irradiate a patient's head for a certain period of time. Considering that the mood of AD patients is prone to fluctuate, one irradiation cannot last too long. An alternative scheme is to irradiate continuously for 10 minutes each time, and irradiate once a day. optionally, the control component 120 can control the near-infrared irradiation module 110 to operate in a pulsed light irradiation mode. For example, the near-infrared irradiation module 110 could emit near-infrared pulsed light with a central wavelength of 700 nm-1100 nm, and irradiate a patient's head at a certain pulse frequency within a certain period of time. The pulse frequency may be 1-100 Hz, optionally 8-50 Hz, preferably 8-12 Hz (preferably 10 Hz) or 38-42 Hz (preferably 40 Hz). Optionally, the control component 120 can adjust the pulse frequency according to specific conditions during the irradiation process, so that different pulse frequencies can be used to irradiate a patient's head within a certain time of irradiation. The light-emitting devices of the near-infrared irradiation module 110 can be selected according to specific needs. For example, a near-infrared light-emitting diode and/or a laser diode may be used. In the following, a near-infrared light-emitting diode is used as an example for description.

Figure 2:
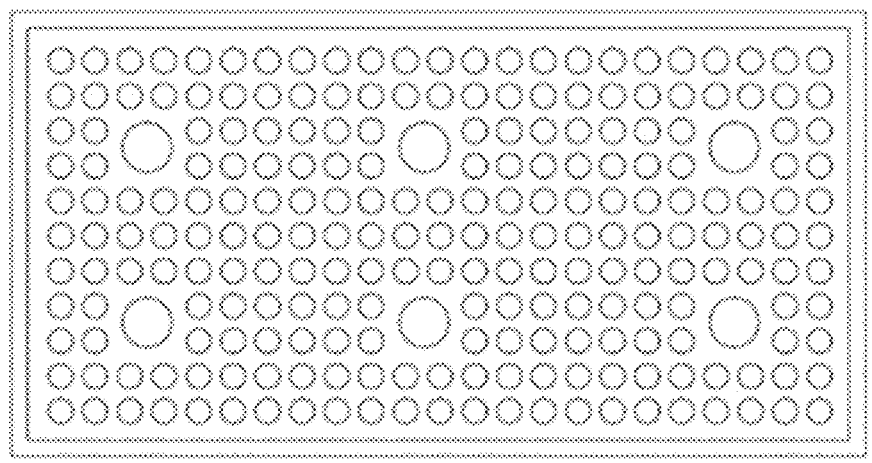
FIG. 2 is a schematic view of the interweaving arrangement of two light-emitting diode arrays emitting two different wavelengths of near-infrared light.

In an optional embodiment, the near-infrared irradiation module 110 includes multiple near-infrared light-emitting diodes, which can emit multiple wavelengths of near-infrared light to irradiate a patient's head. As an example, the multiple wavelengths include the first and second wavelengths with central wavelength values of about 700-1200 nm. Preferably, the central wavelength of the first wavelength is 1020-1120 nm, preferably about 1070 nm, and the central wavelength of the second wavelength is about 760-860 nm, preferably about 810 nm. Correspondingly, the near-infrared irradiation module 110 includes the first and the second light-emitting diode arrays for emitting the first and second wavelengths of near-infrared light, respectively. The control component 120 can control the corresponding light-emitting diode arrays for emitting different wavelengths of near-infrared light to operate alternately. For example, the first and second light-emitting diode arrays can emit light alternately within a certain period of time (for example, 6 minutes) to irradiate a patient's head. Optionally, the control component 120 can also control the corresponding light-emitting diode arrays for emitting different wavelengths of near-infrared light to operate simultaneously. For example, the first and second light-emitting diode arrays can be turned on at the same time, and operate in a continuous light irradiation mode or in a pulsed light irradiation mode within a certain period of time (for example, 6 minutes). Wherein, the control component 120 can control the multiple light-emitting diode arrays to adopt the same pulse frequency, or respectively adopt different pulse frequencies when operating in the pulsed light irradiation mode. As an example, the first light-emitting diode array may adopt a pulse frequency of 1-100 Hz, preferably 8-50 Hz (preferably 10 Hz or 40 Hz), and the second light-emitting diode array may adopt a pulse frequency of 1-100 Hz, preferably 8-50 Hz (preferably 10 Hz or 40 Hz). Optionally, the duty cycle of the pulsed light emitted by the first and second light-emitting diode arrays is about 50%. In the above description, the near-infrared irradiation module 110 emits two different wavelengths of near-infrared light, and each wavelength of the near-infrared light is emitted by one corresponding light-emitting diode array. It could be understood that this is only an illustrative example. The wavelengths that the near-infrared irradiation module 110 can emit are not limited to two, and the corresponding light-emitting diodes are not limited to two. On the other hand, the light-emitting diode arrays emitting different wavelengths of near-infrared light may be arranged sequentially or interweaved. For example, FIG. 2 is a schematic view of interweaving arrangement of two LED arrays emitting two different wavelengths of near-infrared light, wherein the large circle and the small circle respectively represent near-infrared light-emitting diode emitting different wavelengths of near-infrared light.

In addition, it could be understood that the phototherapy device 100 could include multiple near-infrared irradiation modules 110 to irradiate multiple parts of a user's head, and each near-infrared irradiation module 110 has the structure and characteristics as described above. Optionally, the central wavelength, pulse frequency, and type of wavelength of the near-infrared light emitted by each near-infrared irradiation module 110 can be set to be the same or different as required, and the control component 120 can control each near-infrared irradiation module 110 to operate simultaneously or alternately.

The phototherapy device 100 as described above can be implemented with various appropriate appearance structures according to specific needs. For example, the phototherapy device 100 can be implemented with a helmet-type structure that only irradiates the head, a spectacles-type structure that only irradiates the eyes, etc., and may also be implemented as a non-wearing type such as a bulb type, a lamp panel type, and the like.

In one embodiment of the present invention, the phototherapy device 100 adopts the appearance structure of a helmet, and this embodiment will be described in detail below.

Figure 3:
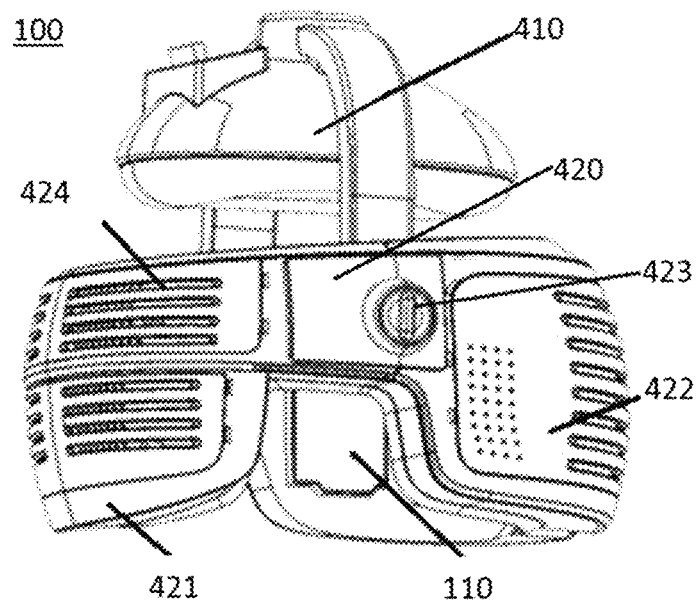
FIG. 3 is a schematic view of the appearance structure of a phototherapy device according to an embodiment of the present invention.

FIG. 3 is a schematic view of the appearance structure of a phototherapy device 100 according to an embodiment of the present invention. As shown in FIG. 3, the phototherapy device 100 further includes a housing adapted to the shape of the human head. The housing includes a top cover 410 and a movable component 420 located under the top cover 410 and fixedly connected to the top cover 410. One or more near-infrared irradiation modules 110 are arranged in the movable component 420, and the distance between the near-infrared irradiation module 110 and a user's head is adjusted by the movable component 420. Optionally, the near-infrared irradiation module 110 may be arranged in the top cover 410 or in both the top cover 410 and the movable component 420. The control component 120 may be arranged in a proper position in the housing.

The movable component 420 includes a front cover 421 and a rear cover 422 disposed oppositely, and an adjusting and connecting mechanism provided between the two. The adjusting and connecting mechanism is used to adjust the distance between the front cover 421 and the rear cover 422. The adjusting and connecting mechanism includes a guide slider arranged at the connecting end of the front cover 421, a sliding groove arranged at the connecting end of the rear cover 422 and matched with the guide slider, and a locking knob 423 used in cooperation with the guide slider. The front cover 421 is slidably connected to the sliding groove of the rear cover 422 through the guide slider, and is fixed by the locking knob 423. It could be understood that by adjusting the distance between the front cover 421 and the rear cover 422 of the movable component 420, the distance between the near-infrared irradiation module 110 arranged in the front cover 421 and/or the rear cover 422 of the movable component 420 and a user's head may be adjusted, such that a suitable irradiation distance is maintained between the user's head and the near-infrared irradiation module 110, for example, 0.5-3 cm. As shown in FIG. 3, multiple heat dissipation holes 424 are also provided on the front cover 421 and the rear cover 422 to ensure good heat dissipation.

Optionally, in order to prevent lamp beads of the light-emitting diode in the near-infrared irradiation module 110 from contacting the skin of a user's head and causing harm to the human body, the near-infrared irradiation module 110 may be provided with a transparent cover covering the light-emitting diode. In addition, optionally, the near-infrared irradiation module 110 may also be provided with a heat dissipation component such as a fan to dissipate heat from the light-emitting diode.

In order to facilitate a user's operation, optionally, a phototherapy device 100 according to an embodiment of the present invention may further include an input component. For example, the phototherapy device 100 may include a remote controller (not shown) electrically coupled with a control component 120 in a wired or wireless manner. The remote controller is used to receive operating parameters input by the user and provide them to the control component 120 to control the operation of the near-infrared irradiation module. The operating parameters may include at least one of irradiation time, irradiation mode, irradiation intensity, and pulse frequency of near-infrared light.

Figure 4:
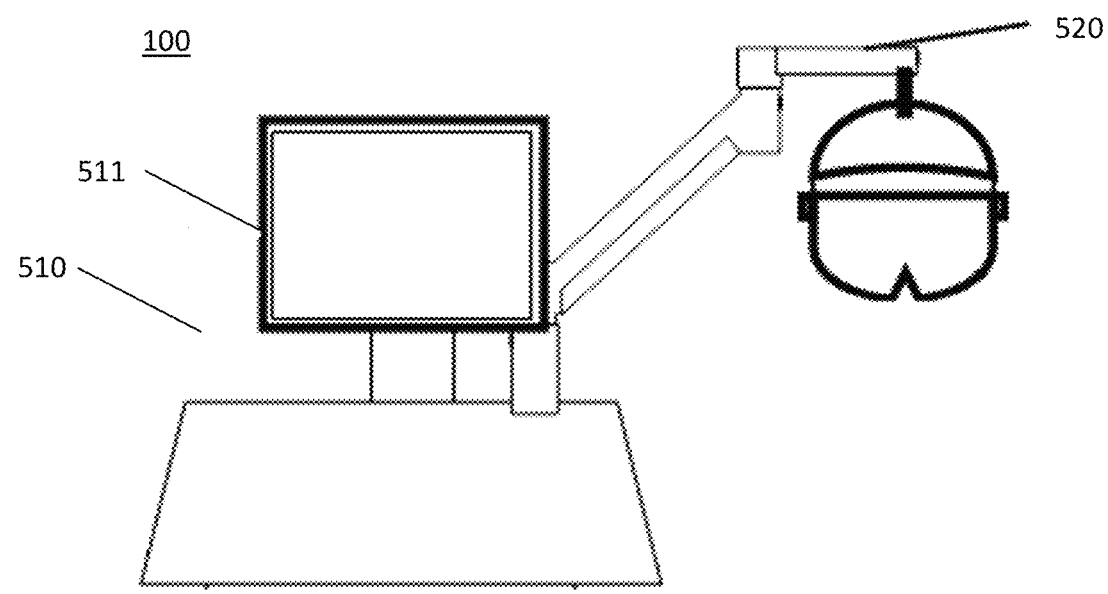
FIG. 4 is a schematic view of the structure of a phototherapy instrument according to another embodiment of the present invention.

FIG. 4 is a schematic view of the structure of a phototherapy instrument 500 according to another embodiment of the present invention. As shown in FIG. 4, the phototherapy instrument 500 includes the phototherapy device 100 described above. For ease of description, the light therapy device 100 with the appearance structure of a helmet is still used as an example in this embodiment.

As shown in FIG. 4, the phototherapy instrument 500 further includes a console 510 and a mechanical arm 520 arranged on the console. The console 510 is provided with an input component 511 for receiving operating parameters input by a user and providing the operating parameters to the control component 120 of the phototherapy device 100 to control the operation of the near-infrared irradiation module. The operating parameters may include at least one of irradiation time, irradiation mode, irradiation intensity, and pulse frequency of near-infrared light. Optionally, in order to prevent incorrect modification of parameters, only authorized user can modify parameters by entering a password. The mechanical arm is connected to the housing of the phototherapy device 100 for controlling the omnidirectional movement of the housing, so that the near-infrared irradiation module contained in the housing can be placed at a suitable height and position for irradiation. The phototherapy device 100 may also be provided with an emergency stop button, which is used to quickly cut off the laser output to protect the user when the device is abnormal.

Hereinafter, a therapeutic scheme using the above-mentioned phototherapy device according to the present invention will be described.

Specifically, the time of irradiation is preferably 10 minutes each time, once a day, 5 days a week.

More specifically, for example, the device of the present invention can be used as follows:

1) Adjusting the light irradiation intensity of the phototherapy instrument to 10-40 mW/cm$^2$, preferably no greater than 25 mW/cm$^2$, and fixing the irradiation intensity of the light source to be unadjustable during treatment;
2) Turnning on the power before use and making sure that the power cord is connected to the instrument; then selectting the irradiation parameter (irradiation time) on the control panel, and clicking the button "OK" to start treatment after setting the parameters. Generally, the phototherapy instrument works in the default parameter mode. (During clinical trials, all phototherapy instruments work according to default parameters);
3) Placing a patient's head under a head-mounted device during treatment, so that the skin of the patient's head is kept at a certain distance (usually 0.5-3 cm) from the light-emitting diode array of the head-mounted device for irradiation.
4) The recommended time of irradiation is 10 minutes each time, once a day, 5 days a week.
5) Cutting of the power once each treatment is over, and automativally saving each irradiation parameter in the control system as the treatment defaults of next time.

The device and method of the present invention can be used to treat Alzheimer's disease, improve brain mitochondrial function and ATP level, promote decomposition of amyloid beta protein (Aβ), reduce Aβ deposition, reduce damage to nerve cells, increase repair and regeneration abilities of nerve tissues, improve cognitive ability, and the like.

EMBODIMENTS

Embodiment 1: Animal Trial of Single-Wavelength Frequency Irradiation

1. Trial Design and Operation

Experimental animals: Lab mice are APP/PS1 double transgenic mice (AD transgenic mice), and control mice are homologous wild-type mice.

Reagent: amyloid beta protein specific antibody.

Figure 5:
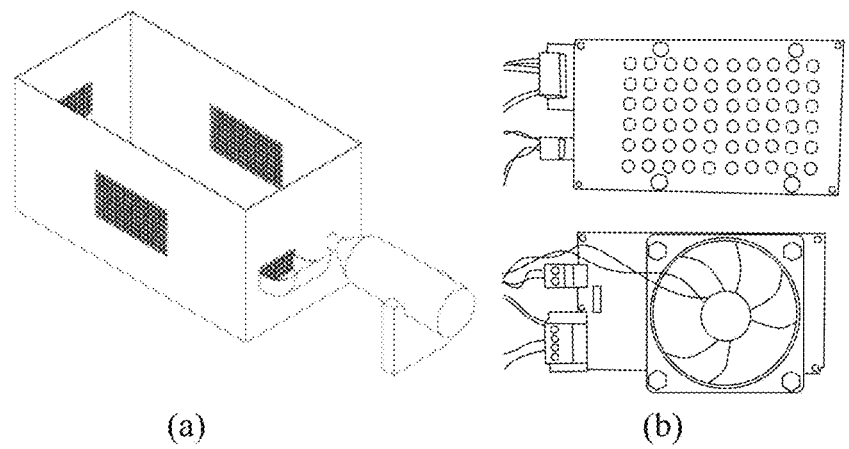
FIG. 5 is a schematic view of a near-infrared irradiation device. (a) an animal container part of the near-infrared light irradiation device; (b) a LED array part of the near-infrared light irradiation device (top)

Experimental instrument: The device was shown in FIGS. 5(a) and 5(b). A near-infrared LED light panel was used on the top to irradiate the mice.

Experimental method: When the mice were raised to 21 weeks, the near-infrared phototherapy was started on the mice. After 45 days of treatment with continuous irradiation, a place navigation trial was carried out for 5 days. On the 6th day, a spatial probe trial was carried out. On the 7th day, the mice were sacrificed and the brains were taken out for immunofluorescence protocol to observe the number and area of Aβ plaques in the mouse brain.

Experimental procedure: The power was firstly turned on and the DDS signal source was adjusted to output required frequency to control the LED array to operate in a frequency. Two groups (irradiation treatment groups) of AD transgenic mice were then put into the animal container one by one. Two LED array panels were placed in the upper center of the animal container, and were ensured to be in close contact with the animal container (LED array panels on the left and right sides of the container were fixed on the container wall and did not need to be moved during the irradiation). According to the group, treatments were performed with irradiation of near-infrared light having a central wavelength of 1070 nm and a frequency of 10 Hz or 40 Hz, respectively. The lab mice were allowed to move freely in the container. The negative control group (wild-type non-AD transgenic mice, not diseased) and the positive control group (AD transgenic mice) were treated with darkness, that is, they were also placed in the animal container, but the power was cut off so that there was no near-infrared light irradiation. Other conditions remained unchanged to avoid the influence of other potential variables. Irradiation was started at 7:00 pm every day, and each mouse was treated with near-infrared light irradiation or darkness for 6 minutes. After completing the irradiation on all mice, the power was turn off and the animal container was cleaned for next experiment. The irradiation treatment was performed continuously for 45 days.

2. Place Navigation

In this phase, the position of the platform was fixed and about 1.0 cm below the water surface. The lab mice were put into the water with their heads facing the pool wall, and the time when the animals find the underwater platform was recorded to investigate the spatial learning and memory ability of the mice. The assay of place navigation was divided into 5 days with 4 trials per day. The assay on day 1 was started after the end of the 45-day irradiation treatment/darkness treatment. The quadrant position of each mouse entering the water referred to the method of assay in the literature (reference: H. F. Iaccarino, A. C. Singer, A. J. Martorell, A. Rudenko, F. Gao, T. Z. Gillingham, H. Mathys, J. Seo, O. Kritskiy, F. Abdurrob, Gamma frequency entrainment attenuates amyloid load and modifies microglia, Nature 540 (7632) (2016) 230). In the first few trainings, if the mouse did not find the underwater escape platform within the specified time (60 seconds), the camera system stopped tracking and positioning, and the analysis system recorded the latency time as 60 seconds. The mouse was then guided using a wooden stick to the platform and kept on the platform for 15 seconds to familiarize and remember the environment. If the mouse found the platform within the set time (60 seconds), the time that was taken for finding the platform will automatically be recognized by the computer and recorded as the latency time. The mouse was also kept on the platform for 15 seconds to familiarize and remember the environment. After 15 seconds, the mouse was removed, dried with a towel, and returned to the cage. After all the mice had completed a single trial, the next round of trial was performed, and the trial sequence of the mice remained unchanged, so that the time between two trials for each mouse was approximately the same.

All mice were trained consecutively for 5 days. As the assay progressed, the time that was taken by the mice for finding the escape platform was getting shorter and shorter.

3. Spatial Probe

On the next day after the end day of the assay of place navigation, the platform that was previously hidden under the water was removed. The mouse entered the water from the southwest side of the opposite quadrant of the target platform to investigate the ability of the mouse to retain the memory of the spatial location of the platform after learning to find the platform. The spatial probe trial took 60 seconds, and only one trial was required. The time when the animal reached the position of the virtual platform for the first time and the number of times the animal traversed the virtual platform within 60 seconds were recorded as the detection index of spatial memory.

4. Immunofluorescence Protocol

On the day after the end of the spatial probe, the mice were sacrificed and the brains were made into paraffin sections and stained with amyloid beta protein-specific antibody. The result of immunofluorescence staining was observed. The biological assay had a standard operating procedure, and the brief process was as follows: the brain was firstly soaked in the fixative for more than 48 hours; the brain was then rinsed, dehydrated with gradient alcohol, and then made transparent with xylene; the brain was immersed in paraffin and embedded into a wax block; the wax block was made into sections of 8-12 μm thick using a microtome, stuck on a glass slide, and dried with baking. Finally, the sections were deparaffinized with xylene, and then Aβ protein was labeled with immunofluorescence antibody. The excess antibody was washed off, and then the number and area of Aβ protein were observed and counted with a microscope.

5. Result

1) Water Maze (1) Result of the Place Navigation

Figure 6:
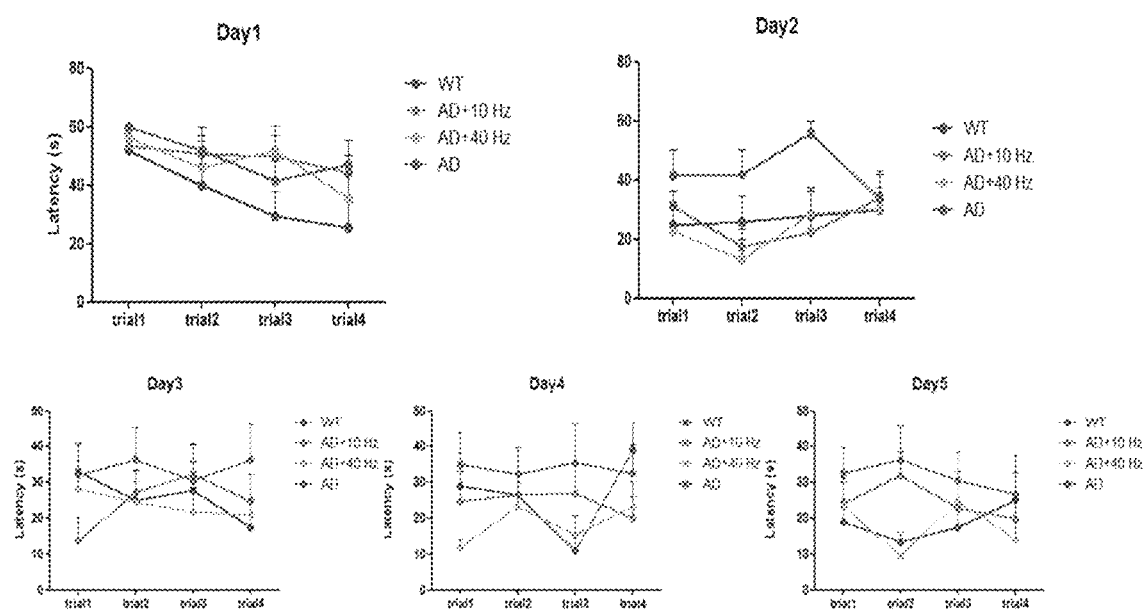
FIG. 6 is a line chart of the distribution of results of four trials per day in place navigation.

The latency time of each trial was averaged (±standard error) according to the group, and then learning curve charts of different groups of mice from trial 1 to trial 4 every day were obtained. As shown in FIG. 6, it could be found that the longest latency time was observed during trial 1 on the first day, and the latency time was gradually improved in the following three trials. In the four trials on the first day, the latency time of each group showed a gradually decreasing trend. On the whole, mice in the normal group performed better than the other three groups, and the difference between the other three groups was not obvious. From the second day to the fifth day, the four trials per day showed jagged fluctuations, and the latency time of mice in the positive control group was significantly longer than that of the other three groups.

The data of 4 trials per day were averaged to obtain the latency time of the mice to find the platform during the place navigation from the first day to the fifth day. We integrated the five-day learning data to draw an overall learning curve graph, which is also the most commonly used indicator in water maze analysis.

Figure 7:
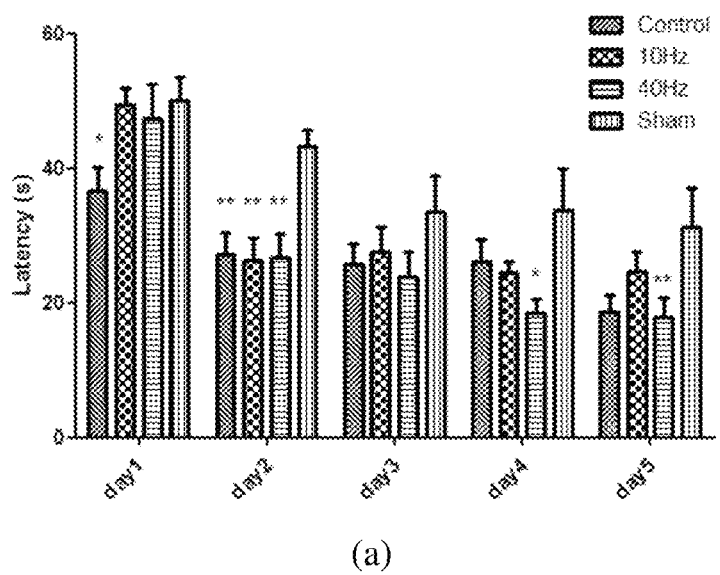
FIG. 7 shows the statistical result of latency time of place navigation in a water maze, wehrein figure (a) is a histogram of latency time of place navigation in the water maze; figure (b) is a line chart of latency time of place navigation in the water maze, all data are represented in the form of mean±standard deviation two-way ANOVA is used to compare the means of four groups of Control/wt (n=8), AD+10 Hz (n=8), AD+40 Hz (n=8), and Sham/AD (n=8), and a Bonferroni method is used for post-hoc analysis; and the significance of difference is represented by the number of * (* means $p<0.05$,  means $p<0.01$, * means $p<0.001$)
Figure 7:
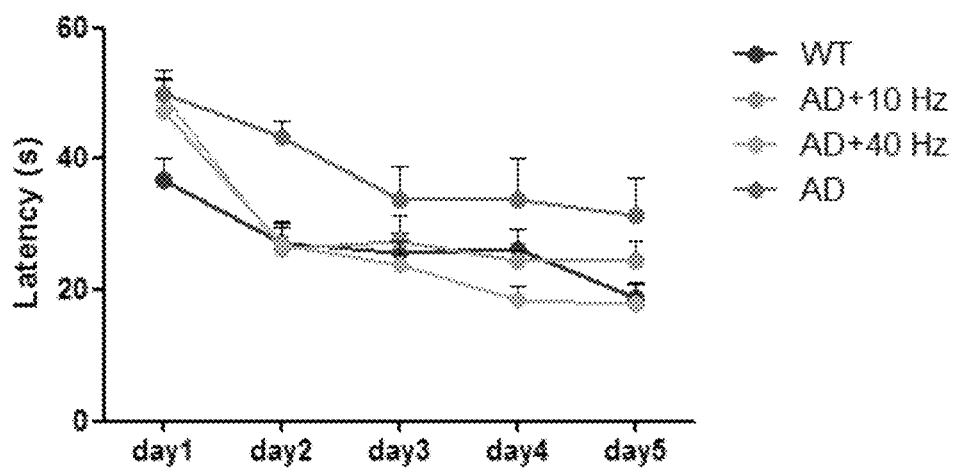

The result is shown in FIG. 7. FIG. 7(a) shows the result of assay in the form of a histogram, which is mainly used to compare the daily differences between different groups. FIG. 7(b) shows the result of assay in the form of a line chart, which is mainly used to analyze the trend of the result of assay over time, so as to facilitate the comparison of the differences between the groups as a whole.

In theory, the shorter the time that was taken by lab mice for finding an escape platform, the stronger the learning and spatial memory abilities. It can be seen from FIG. 7 that the mice in the negative control group took significantly less time to find the platform on the first day than those of the other three groups. The mice in the other three groups were at the same level of latency time (about 50 seconds), with no significant difference. In addition, it was found that the mice in the wild-type group were guided to the platform more easily during the assay, which indicates that the cognitive and memory abilities of normal mice for the platform were better than those of other groups during the initial training process. On the second day, the time that was taken by the mice in the 10 Hz and 40 Hz irradiation treatment groups for finding the platform was reduced significantly, reaching the same level as normal mice (both about 25 seconds). The time that was taken by the positive control mice for finding the platform was more than forty seconds without significant decrease, which was significantly different from the other three groups in statistics.

This demonstrates that the mice treated with irradiation had a better learning curve, and reached a level close to that of normal mice on the second day. It was not until the third day that the latency time of mice in the positive control group decreased significantly. On the fourth day, the time that was taken by the mice in the 40 Hz irradiation treatment group for finding the platform decreased significantly. The performance of finding the platform was better than those of the other three groups of mice with statistical difference. On the fifth day, the time that was taken by the mice in the normal group for finding a platform decreased significantly. Finally, the normal group and the 40 Hz irradiation treatment group reached the same level with a statistically significant difference from the positive control group.

Figure 8:
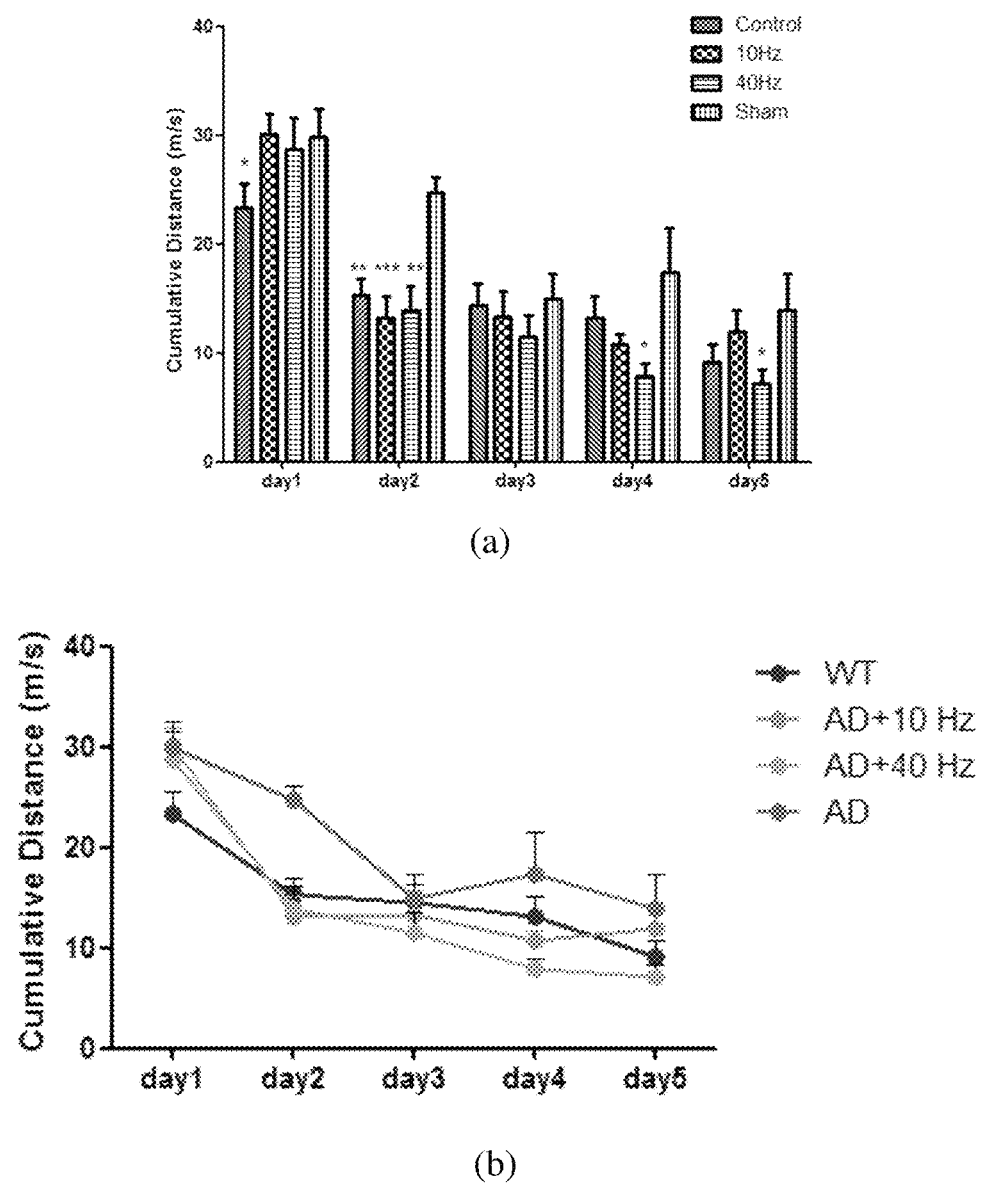
FIG. 8 shows the statistical result of a cumulative distance from a platform of place navigation in a water maze, wherein figure (a) is a histogram of a cumulative distance from a platform of place navigation in the water maze, figure (b) is a line chart of a cumulative distance from a platform of place navigation in the water maze, all data are represented in the form of mean±standard deviation, two-way ANOVA is used to compare the means of four groups of Control/wt (n=8), AD+10 Hz (n=8), AD+40 Hz (n=8), and Sham/AD (n=8), and a Bonferroni method is used for post-hoc analysis; and wherein the significance of difference is represented by the number of * (* means $p<0.05$,  means $p<0.01$, * means $p<0.001$)

Another effective indicator in the water maze trial is the cumulative distance of a trial animal from a target platform. The quantity of this indicator is generated by the following method: in a single 60 s assay, an image tracking program measures the distance of a mouse from the platform once every second and sums the obtained distances. The cumulative distance has been proven to be one of better indexes for evaluating spatial learning ability. The statistical result is shown in FIG. 8. It can be found that the image distribution and trend of the cumulative distance from a platform are very similar to those of the analysis image of the latency time. The two indexes illustrate the same problem from different perspectives, which also provides strong evidence for us to draw relevant conclusions later.

Taken together, the data of the five-day place navigation are analyzed separately from the perspective of time and group. From the perspective of time, both of the time that is taken by mice in each group for finding the escape platform and the cumulative distance from the target platform have a gradual downward trend, indicating that as the training progresses, the mouse's memory of the platform becomes more and more accurate, and the target platform can be found faster and faster, which is in line with the expectations of the assay. From the perspective of group, from the first day to the fifth day, the performance of the positive control group is worse than those of the other three groups. In addition, the mice in different groups have great differences in the learning curve. The effect of learning of the mice in the normal group and the irradiation treatment group is the most significant on the first day to the second day with the time and the cumulative distance from the platform decreased the most. After the second day, the downward trend is relatively moderate, and the time taken for finding the platform is maintained within an interval of 19 s to 25 s, which shows faster learning ability and better memory ability, so that a relatively saturated state is reached within two days. Moreover, the line charts of the 10 Hz irradiation treatment group and the normal mouse group are cross-linked together, proving that the learning speed and the performance status of the two groups are similar. The overall decline trend in the time that is taken by the positive control group for finding a platform is relatively stable, with the most obvious decline on the second day to the third day (the irradiation treatment group and the normal mouse group have the most obvious decline on first day to the second day), indicating that their learning speed is slower than other groups. In summary, the place navigation assay shows that near-infrared light irradiation has a therapeutic effect, but the difference between different irradiation groups (10 Hz and 40 Hz) is not very obvious.

(2) Analysis of Result of the Spatial Probe

Figure 9:
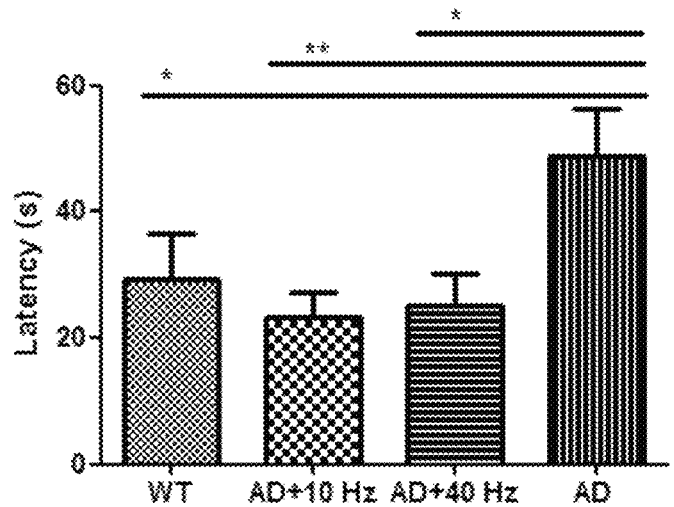
FIG. 9 shows the statistical result of spatial probe trial in a water maze, wehrein figure (a) is a histogram of time to traverse a platform for the first time in the spatial probe trial in the water maze, and figure (b) is a histogram of number of times of traversing a platform in the spatial probe trial in the water maze; all data are represented in the form of mean±standard deviation, and two-way ANOVA is used to compare the means of four groups of wt (n=8), AD+10 Hz (n=8), AD+40 Hz (n=8), and AD (n=8), and a Bonferroni method is used for post-hoc analysis, and wherein the significance of difference is represented by the number of * (* means $p<0.05$,  means $p<0.01$, * means $p<0.001$)
Figure 9:
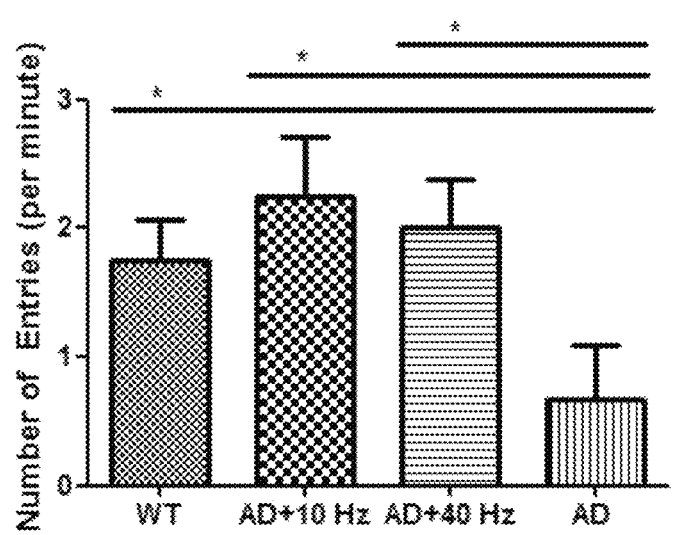

The original escape platform was removed, and the mouse was placed in the water at the opposite quadrant. The mouse was allowed to swim freely in the pool for 60 seconds. The memory of the mouse for the original platform position was detected by recording and analyzing relevant data. Theoretically, the shorter the time taken for entering the virtual platform for the first time and the more the number of times of traversing the virtual platform within 60 seconds, the better the memory of the location of the platform and the stronger the learning ability of mice. FIG. 9 shows the result of spatial probe assay on the sixth day. FIG. (a) shows the time taken by the mice for entering the target platform for the first time. There are great differences between different groups. The average time taken by the mice in the normal group, the 10 Hz irradiation treatment group, the 40 Hz irradiation treatment group and the positive control group for finding the platform for the first time are 29.24 s, 23.34 s, 25.06 s and 48.85 s, respectively. It can be found that the mice in the positive control group took significantly longer time than the mice in the other three groups with statistical difference. The difference between the other groups is not obvious. FIG. (b) shows the number of times the mice traversed the virtual platform in 60 seconds. There is a great difference between different groups. The average number of times of traversing of the mice in the normal group, the 10 Hz irradiation treatment group, the 40 Hz irradiation treatment group and the positive control group are 1.75 times, 2.25 times, 2.00 times and 0.67 times, respectively. It can be found that the number of times of traversing the virtual platform of the mice in the positive control group is significantly less than that of the mice in the other three groups with statistical difference. The difference between the other groups is not obvious.

Based on the evaluation index of the water maze trial, if the mouse can traverse the position of the virtual platform for the first time within 25 seconds, and traverse the virtual platform more than twice within 60 seconds, it proves that the mouse has reached the standard in the spatial probe. According to this criterion, the two groups of mice treated with 10 Hz and 40 Hz irradiation performed significantly better than the positive control group, and met the evaluation index of the spatial probe assay, indicating that the irradiation treatment has a significant effect. There is no significant difference between the two groups of mice treated with 10 Hz and 40 Hz of irradiation, respectively.

2) Result of Immunofluorescence

The main purpose of the immunofluorescence assay in this study is to observe and quantitatively analyze the deposition of Aβ protein plaques in the cerebral cortex and hippocampus of mice. According to the study by Howlett et al., (S. Michalikova et al., Emotional responses and memory performance of middle-aged CD1 mice in a 3D maze: Effects of low infrared light, Neurobiology of Learning and Memory 89 (2008) 480-488), these two areas are main areas that produce Aβ protein in the brain. The amount of Aβ protein is one of the important indexes for determining the onset of AD, and helps to analyze and compare the therapeutic effects of near-infrared light therapy more accurately. Intuitively speaking, the larger the fluorescent plaque and the higher the brightness, the more the Aβ protein deposition and the more serious the disease. The specific statistical analysis method is to determine the size and number of fluorescent plaques based on the results of a fluorescent microscope. All pictures were taken under a 5× magnifying glass with a scale of 200 μm, and the same area of hippocampus was observed.

Figure 10:
FIG. 10 shows the typical staining result of the wild-type group.
Figure 11:
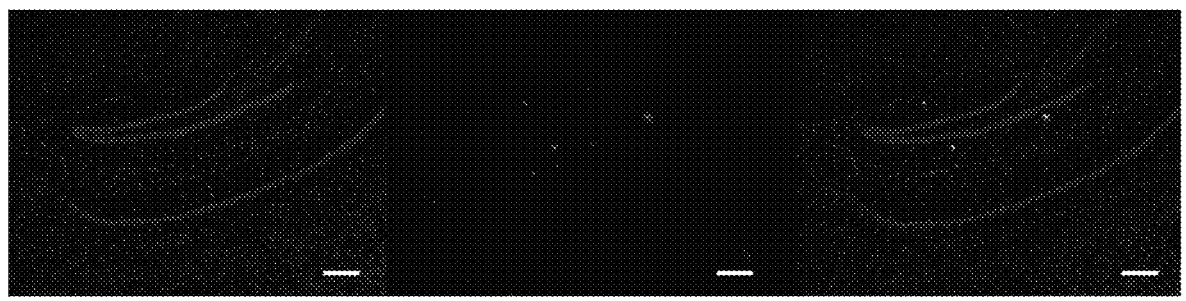
FIG. 11 shows the typical staining result of the AD+10Hz group.
Figure 12:
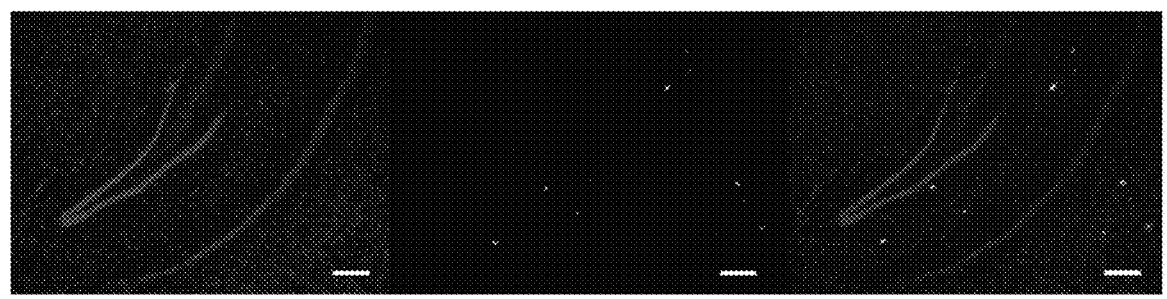
FIG. 12 shows the typical staining result of the AD+40Hz group.
Figure 13:
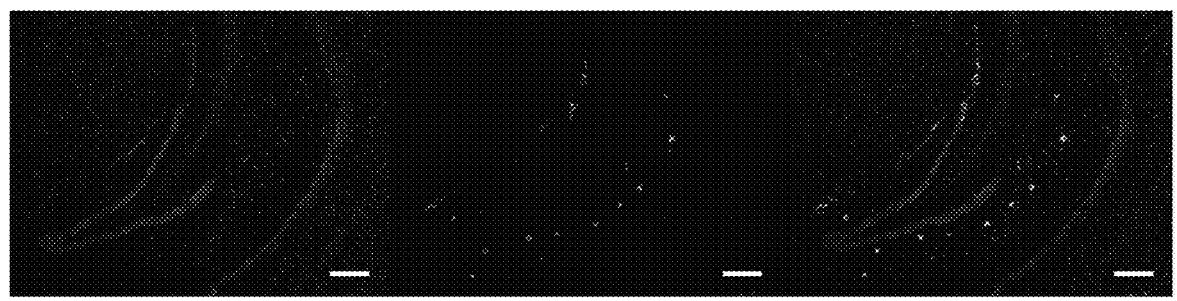
FIG. 13 shows the typical staining result of the AD positive control group.

The results of immunofluorescence assay are shown in FIGS. 10-13. Each group of pictures contains three images, i.e., the DAPI staining image, the Aβ protein staining image, and the combined image, from left to right. The DAPI staining is used to clarify the structure of the cell. The position of the nucleus is determined by DAPI, so that the position of fluorescent staining can be determined. FIG. 10 shows a typical immunofluorescence result of mice in the wild-type normal group, in which no Aβ protein is found. FIG. 11 shows a typical immunofluorescence result of mice in the AD+10 Hz group, in which a small amount of Aβ protein depositions are found. FIG. 12 shows a typical immunofluorescence result of mice in the AD+40 Hz group, in which a little more Aβ protein depositions are found. FIG. 13 shows a typical immunofluorescence result of mice in the positive control group, in which more Aβ protein depositions are found.

Through the comparison of FIGS. 10-13, we can intuitively observe that the Aβ protein deposition of mice in different groups has significant differences visible to the naked eye. The mice in the positive control group are significantly higher than mice in the two treatment groups in both the amount and size of Aβ plaque deposition. This proves that near-infrared light irradiation therapy can help to clear Aβ protein, thereby achieving a more obvious therapeutic effect on Alzheimer's disease. The immunofluorescence results of mice in the 10 Hz group and the 40 Hz group are compared, and it is found that there is also a certain difference. The brightness of plaques of mice in the 10 Hz treatment group is darker than that of plaques of mice in the 40 Hz treatment group, and the area of plaques of mice in the 10 Hz treatment group is also smaller than that of plaques of mice in the 40 Hz treatment group. This shows that the therapeutic effect of 10 Hz is better than that of 40 Hz to a certain extent, and the therapeutic effect of near-infrared light is frequency selective.

Figure 14:
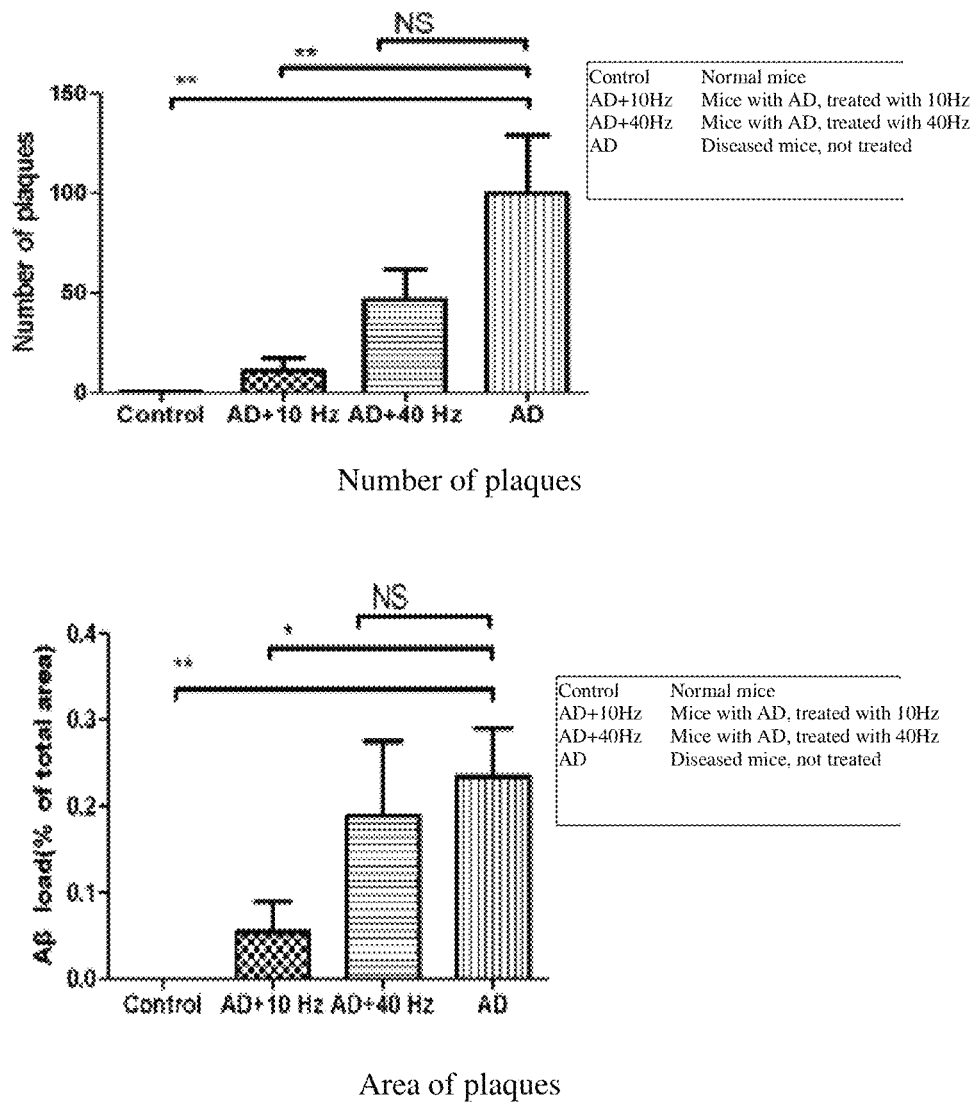
FIG. 14 shows the quantitative data statistic of the immunofluorescence method, wherein all data are represented in the form of mean±standard deviation, and two-way ANOVA is used to compare between groups, and a Bonferroni method is used for post-hoc analysis, and wherein the significance of difference is represented by the number of * (* means $p<0.05$,  means $p<0.01$, * means $p<0.001$)

The brains of the mice were dissected, and the Aβ level in the brains of APP/ps1 mice and normal mice was evaluated by immunofluorescence and quantitative analysis. As shown in FIG. 14, the result of immunofluorescence assay shows that: no Aβ plaque is found in the brains of normal mice. Aβ plaques are found in the brains of APP/ps1 mice. The number and area of Aβ plaques in the hippocampus are 99 and 0.23%, respectively. The number of Aβ plaques in the hippocampus in the AD+10 Hz group is reduced by 90% compared with that in the AD group (p=0.0053), while the area of Aβ plaques in the hippocampus in the AD+10 Hz group is reduced by 77.02% (p=0.0236). The number and area of Aβ plaques in the hippocampus in the AD+40Hz group are reduced by 53.29% and 19.34%, respectively. These results indicate that 10 Hz of light irradiation is more effective than 40 Hz in reducing Aβ plaques in the hippocampus of APP/ps1 mice.

Embodiment 2: Animal Trial of Dual-Wavelength Frequency Irradiation

1. Trial Design and Operation

Experimental animals: Lab mice were APP/PS1 double transgenic mice (AD transgenic mice), and control mice were homologous wild-type mice.

Reagent: amyloid beta protein specific antibody.

Experimental instrument: The assay device was shown in FIGS. 5(a) and 5(b). A near-infrared LED light panel was used on the top to irradiate the mice.

Experimental method: When the mice were raised to 6.5 months, the near-infrared light treatment assay was started on the mice. After 51 days of treatment with continuous irradiation, the mice were sacrificed and the brains were taken out for immunofluorescence assay to observe the number and area of Aβ plaques in the mouse brain.

Experimental procedure: Referring to Embodiment 1, except that two trials were performed in this assay: 1) Comparison of therapeutic effects of dual-wavelength and single-wavelength irradiations; 2) Comparison of therapeutic effects of dual-wavelength irradiations at specific frequencies. The specific operations were as follows:

1) Comparison of therapeutic effects of dual-wavelength and single-wavelength irradiations: The mice were divided into two groups, 7 mice in each group. The first group was treated with continuous near-infrared irradiation with a central wavelength of 1070 nm; the second group was treated with continuous near-infrared irradiation with two central wavelengths, wherein the central wavelengths were 810 nm and 1070 nm respectively. Each irradiation was performed for 10 minutes. After 51 days of continuous irradiation, the mice were sacrificed to obtain brains, and paraffin sections were made and stained. Then, the area of Aβ plaques in the cerebral cortex was counted, and whether there were significant differences was statistically analyzed.

2) Comparison of therapeutic effects of dual-wavelength irradiations at specific frequencies: The mice were divided into four groups, 7 mice in each group. The first group was treated with continuous near-infrared irradiation with two central wavelengths, wherein the central wavelengths were 810 nm and 1070 nm, respectively; the second group was treated with near-infrared irradiation with two central wavelengths at a frequency of 10 Hz, wherein the central wavelengths were 810 nm and 1070 nm, respectively; the third group and the fourth group were the positive control group and the negative control group, respectively, without near-infrared treatment. Each irradiation was performed for 10 minutes. After 51 days of continuous irradiation, the mice were sacrificed to obtain brains, and paraffin sections were made and stained. The number of Aβ plaques in the cerebral cortex in each group was counted, and whether there were significant differences was statistically analyzed.

2. Results

Figure 15:
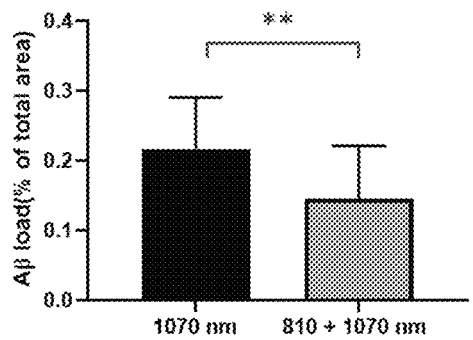
FIG. 15 shows the statistics of Aβ plaque area in cerebral cortex of mice continuously irradiated by a dual-wavelength with central wavelength of 810 nm and 1070 nm, and a single-wavelength with center wavelength of 1070 nm; wherein all data are represented in the form of mean±standard deviation, and two-way ANOVA is used to compare between groups, and a Bonferroni method is used for post-hoc analysis, and wherein the significance of difference is represented by the number of * (* means $p<0.05$,  means $p<0.01$, * means $p<0.001$)

1) Comparison of Therapeutic Effects of Dual-Wavelength and Single-Wavelength Irradiations By comparing the area of Aβ plaques in the cerebral cortex of the mice after continuous irradiation with single-wavelength and dual-wavelength, we found that the area of Aβ plaques in the dual-wavelength irradiation group was less than that in the single-wavelength irradiation group with statistical difference. The result is shown in FIG. 15, wherein the area of Aβ plaques after continuous irradiation with a single-wavelength of 1070 nm is 0.22%, and the area of Aβ plaques after continuous irradiation with a dual-wavelength of 810+1070 nm is 0.15%.

Figure 16:
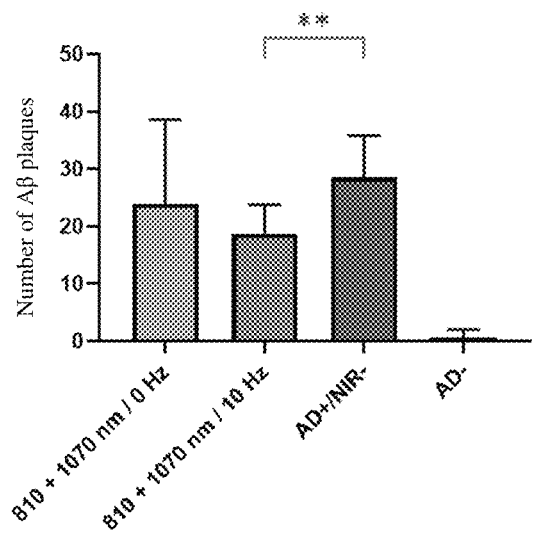
FIG. 16 shows the statistics of Aβ plaque number in cerebral cortex of mice in 810+1070 nm/0 Hz (continuous irradiation) dual-wavelength irradiation group, 810+1070 nm/10 Hz dual-wavelength irradiation group, AD positive control group and negative control group, wherein all data are represented in the form of mean±standard deviation, and two-way ANOVA is used to compare between groups, and a Bonferroni method is used for post-hoc analysis, and wherein the significance of difference is represented by the number of * (* means $p<0.05$,  means $p<0.01$, * means $p<0.001$)

2) Comparison of Therapeutic Effects of Dual-Wavelength Irradiations at Specific Frequencies By comparing dual-wavelength irradiation at specific frequency, continuous irradiation with dual-wavelength, positive control group and negative control group, we analyzed that dual-wavelength irradiation at 10 Hz (central wavelengths were 810 nm and 1070 nm) showed the best effect with statistical difference compared with the positive control group. The result is shown in FIG. 16, wherein the number of Aβ plaques after irradiation with dual-wavelength of 810+1070 nm/10 Hz is 18.7, which is lower than 28.5 in the positive control group, and there is statistical difference. The number of Aβ plaques after continuous irradiation with dual-wavelength of 810+1070 nm/0 Hz is 23.8, which is also lower than 28.5 in the control group.

Figure 17:
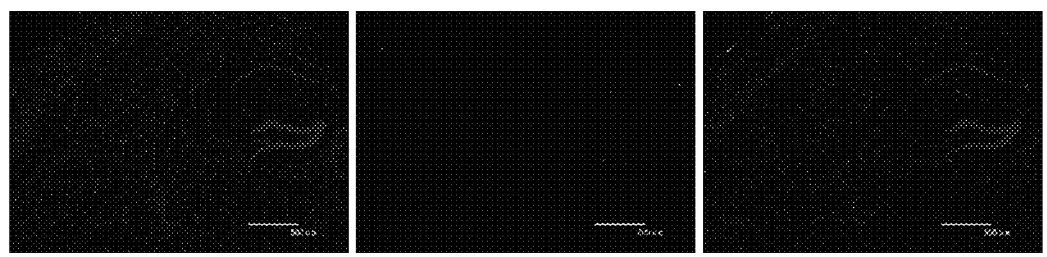
FIG. 17 shows the typical staining result of the 810+1070 nm/10 Hz dual-wavelength irradiation group.
Figure 18:
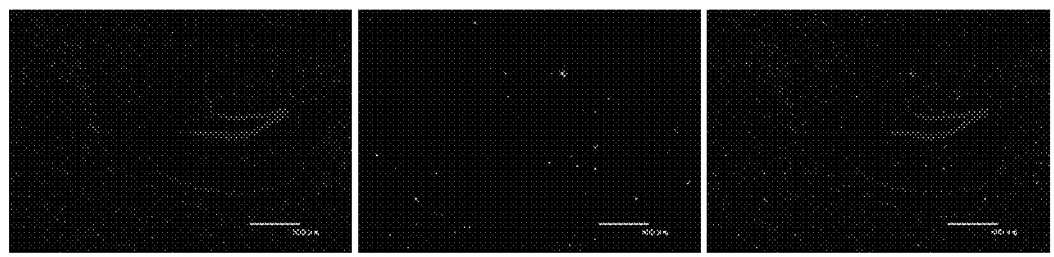
FIG. 18 shows the typical staining result of the AD positive control group.

In addition, we also compared the immunofluorescence pictures of the second group (treatment with near-infrared irradiation with two central wavelengths of 810 nm and 1070 nm at a frequency of 10 Hz) and the third group (positive control group) for intuitive comparison of the therapeutic effect of the second group. The pictures were taken under a 40× magnifying glass with a scale of 500 μm, and the observed area was hippocampus. As shown in FIGS. 17-18, each group of pictures contains three images, i.e., the DAPI staining image, the Aβ protein staining image, and the combined image, from left to right. The DAPI staining is used to clarify the structure of the cell. The position of the nucleus is determined by DAPI, so that the position of fluorescent staining can be determined. FIG. 17 shows a typical immunofluorescence result of the second group of mice, with less Aβ protein depositions. FIG. 18 shows a typical immunofluorescence result of positive control mice, with more Aβ protein depositions. This indicates that Aβ protein depositions are significantly reduced after phototherapy.

Embodiment 3: Clinical Trial of Phototherapy Instrument for Alzheimer's Disease

1. Protocol of Trial

This study was a prospective, open, randomized, parallel controlled clinical study, including 9 subjects. Subjects who met trial conditions were randomly divided into a trial group and a control group. The trial device was used and the original intervention measures were maintained in the trial group, and the original intervention measures were maintained in the control group during the treatment period. Finally, the effectiveness and safety of the phototherapy instrument for Alzheimer's disease in clinical application were judged according to the comparison between the trial group and the control group.

2. Instrument for Trial

Product Name: Phototherapy Instrument for Alzheimer's Disease

Model: DD-1601

Manufacturer: Zhejiang Brainhealth Medical Tech. Co., Ltd.

The device had a wavelength range of 700-1200 nm, and was mainly composed of two kinds of LEDs with central wavelengths of 810 nm and 1070 nm, respectively; the LEDs adopt a frequency working mode with a frequency of 10 Hz. The LEDs had a light emission power of 15 mW (when the working current is 50 mA), a divergence angle of 15 degrees, a central wavelength of 1070±20 nm (or 810±20 nm, when the working current was 50 mA), and a half-width of less than 40 nm.

3. Method of Trial

Subjects in both the trial group and the control group were continued to maintain a basic treatment of donepezil hydrochloride, and subjects in the trial group received additional treatment with phototherapy instrument for Alzheimer's disease. 4 weeks of treatment with phototherapy instrument was a course of treatment. In this trial, the trial group received 3 courses of treatment, which were performed continuously without interval between each course.

The participation time of each subject in the trial was defined as the time from the time the patient agreed to be enrolled in the trial to the end of the final follow-up. According to the trial design, the expected duration of participation of each subject was as follows: the screening period: 2 weeks; the treatment period: 3 months; the follow-up period: 1 month.

4. Screening of Subject

Inclusion Criteria:

Subjects participating in this clinical trial must meet all of the following criteria:

1) 50-85 years old, no gender limit;
2) All patients have been diagnosed to meet criteria in accordance with the "The Diagnostic and Statistical Manual of Mental Disorders" 4th Revised Edition (DSM-IV) and the diagnostic criteria made by The National Institute of Neurological and Communicative Disorders—Alzheimer's disease and Related Disorders Association (NINCDS-ADRDA) for Alzheimer's disease (AD);
3) A cranial MRI examination (receiving examination results within 6 months) meets this diagnosis, except for those caused by progressive structural central nervous system disease or progressive encephalopathy;
4) At least 12 months of cognitive decline and/or memory impairment;
5) HAMD score ≤17, HIS score ≤4, except for moderate and severe depression and vascular dementia;
6) MMSE score ≥10, 3-5 grade of GDS (that is, including early and mid-stage Alzheimer's patients);
7) Standardized treatment with donepezil hydrochloride for at least 2 weeks without other interventions;
8) The patient has a fixed caregiver who is willing to accompany the patient to receive irradiation treatment every day;
9) The patients agree to participate in this clinical trial, is willing to maintain the original treatment plan during the trial, and has signed an informed consent form.

Exclusion Criteria:

1) Patients with infectious diseases such as hepatitis A, hepatitis B, AIDS, tuberculosis, etc. that are currently active;
2) Patients with severe arrhythmia (such as ventricular tachycardia, frequent supraventricular tachycardia, atrial fibrillation, atrial flutter, etc.) or cardiac conduction abnormalities above NYHA grade II;
3) Severe respiratory dysfunction caused by respiratory diseases;
4) Patients with liver disease or liver injury (ALT or AST>2 times the upper limit of normal);
5) Patients with severe renal impairment or renal failure (serum creatinine>1.5 times the upper limit of normal);
6) Patients with hematological disease (such as leukemia, sepsis, etc.), malignant tumors or weakened immune function;
7) Subjects who have had a stroke in the past 2 years;
8) Patients with other types of dementia, or with neurological diseases such as epilepsy, schizophrenia, severe depression, Parkinson's disease, etc.;
9) Patients with brain tumors;
10) Subjects with severe visual or hearing impairment;
11) People with alcohol dependence, drug addicts, people who are addicted to other drugs, or people with addiction tendency;
12) Those who have participated in other drug trials within two months;
13) Subjects who are considered unsuitable by the researcher to participate in this clinical trial.

5. Main Purpose and Evaluation Index

Main purpose: To evaluate whether the cognitive ability of patients with Alzheimer's disease in early and mid-stage is improved compared with that of the control group after treating with the phototherapy instrument for Alzheimer's disease for three months.

Evaluation Index and Selection Basis:
1) Primary effectiveness endpoint: total score of Visit 5 (84 days±3 days) in Alzheimer's disease Assessment Scale Cognitive Subscale (ADAS-cog, see: Rosen W G, Mohs R C, Davis K L. A new rating scale for Alzheimer's disease. Am J Psychiatry, 1984, 141:1356-1364);
2) Secondary effectiveness endpoint: total score of Alzheimer's disease Assessment Scale Cognitive Subscale (ADAS-cog) and scores of various perspectives, total score of Activities of Daily Living (ADL) and scores of various perspectives, total score of mini—mental state examination (MMSE) and scores of various perspectives, total score of Neuropsychiatric Inventory (NPI), total score of Clinician Interview Based Impression Change (CIBIC-plus), total score of global decline scale (GDS), cranial MRI 3D sequence inspection results, Electroencephalogram (EEG) inspection results, Transcranial Doppler (TCD) inspection results, and performance of device;
3) Safety endpoint: the incidence and frequency of adverse events, serious adverse events, device-related adverse events, device-related serious adverse events, and death events, device defects, vital signs, laboratory inspections and ECG inspections.

6. Interim Analysis Results

1) Distribution of Subjects

A total of 9 subjects were screened in this study. 0 subjects failed the screening. 9 subjects successfully passed the screening and joined into the group for study, wherein the trial group contained 4 subjects and the control group contained 5 subjects. The 9 subjects all entered the safety set (SS). See Table 1 for details.

TABLE 1

Summary of Subject Distribution (SS)

| | Groups | | |
|---|---|---|---|
| | The trial group (N = 4) | The control group (N = 5) | Total (N = 9) |
| Screened subjects | 4 | 5 | 9 |
| Safety set | 4 | 5 | 9 |
| Full analysis set, n (%) | 4 (100.0%) | 5 (100.0%) | 9 (100.0%) |
| Per Protocol Set, n (%) | 4 (100.0%) | 5 (100.0%) | 9 (100.0%) |
| Number of subjects who completed the study | 4 | 5 | 9 |

2) Main Efficacy Index

The average total score of the baseline ADAS-cog scale in the trial group was 20.3 points (4.57 points) (range: 17 points to 27 points), and the average total score on day 84 was 13.8 points (5.91 points) (range: 6 points to 20 points), which was 6.5 points (3.70 points) (range: −11 points to −2 points) less than that of the baseline on an average.

The average total score of the baseline ADAS-cog scale of the control group was 17.8 points (6.53 points) (range: 7 points to 24 points), and the average total score on day 84 was 16.4 points (7.54 points) (range: 3 points to 21 points), which was 1.4 points (3.29 points) (range: −4 points to 4 points) less than that of the baseline on an average.

As compared to the control group, the change of the score on day 84 from the baseline score of the trial group is 5.1 points lower (95% CI: −10.6 points, 0.4 points). See Table 2 for details.

TABLE 2

Total score of ADAS-cog scale on day 84

| Total score of ADAS-cog scale | | The trial group (N = 4) | The control group (N = 5) | Difference (95% CI) |
|---|---|---|---|---|
| Baseline | n(nmiss) | 4(0) | 5(0) | |
| | Mean(SD) | 20.3(4.57) | 17.8(6.53) | |
| | Median | 18.5 | 20.0 | |
| | Q1, Q3 | 17.5, 23.0 | 17.0, 21.0 | |
| | Min, Max | 17, 27 | 7, 24 | |
| Day 84 | n(nmiss) | 4(0) | 5(0) | |
| | Mean(SD) | 13.8(5.91) | 16.4(7.54) | |
| | Median | 14.5 | 19.0 | |
| | Q1, Q3 | 9.5, 18.0 | 19.0, 20.0 | |
| | Min, Max | 6, 20 | 3, 21 | |
| Day 84-baseline | n(nmiss) | 4(0) | 5(0) | −5.1(−10.6, 0.4) |
| | Mean(SD) | −6.5(3.70) | −1.4(3.29) | |
| | Median | −6.5 | −2.0 | |
| | Q1, Q3 | −9.0, −4.0 | −4.0, −1.0 | |
| | Min, Max | −11, −2 | −4, 4 | |

In the safety set, the total scores of ADAS-cog in each of the visits 3-5 have statistically significant decreases compared with that of the baseline. In the control group, the decrease in the total scores of ADAS-cog in each visit compared with the baseline was not statistically significant. See Table 3 for details.

TABLE 3

Changes in the total score of each visit of the ADAS-cog scale

| | | | The trial group (N = 4) | | The control group (N = 5) | |
|---|---|---|---|---|---|---|
| | Visits | | Observed value | Difference (after − before) | Observed value | Difference (after − before) |
| Total score | visit 2 | n(nmiss) | 4(0) | | 5(0) | |
| | | Mean(SD) | 20.3(4.57) | | 17.8(6.53) | |
| | | Median | 18.5 | | 20.0 | |
| | | Q1, Q3 | 17.5, 23.0 | | 17.0, 21.0 | |
| | | Min, Max | 17, 27 | | 7, 24 | |

TABLE 3-continued

Changes in the total score of each visit of the ADAS-cog scale

| Visits | | The trial group (N = 4) | | The control group (N = 5) | |
|---|---|---|---|---|---|
| | | Observed value | Difference (after − before) | Observed value | Difference (after − before) |
| visit 3 | n(nmiss) | 4(0) | 4(0) | 5(0) | 5(0) |
| | Mean(SD) | 15.3(4.99) | −5.0(1.41) | 15.8(6.46) | −2.0(3.87) |
| | Median | 14.5 | −4.5 | 19.0 | −1.0 |
| | Q1, Q3 | 12.0, 18.5 | −6.0, −4.0 | 10.0, 19.0 | −5.0, 1.0 |
| | Min, Max | 10, 22 | −7, −4 | 8, 23 | −7, 2 |
| | 95% CI | | −7.25, −2.75 | | −6.81, 2.81 |
| | P value | | 0.0058 | | 0.3125 |
| visit 4 | n(nmiss) | 4(0) | 4(0) | 5(0) | 5(0) |
| | Mean(SD) | 15.3(6.50) | −5.0(2.94) | 15.0(7.07) | −2.8(3.56) |
| | Median | 14.0 | −5.0 | 16.0 | −4.0 |
| | Q1, Q3 | 10.5, 20.0 | −7.5, −2.5 | 12.0, 18.0 | −5.0, −2.0 |
| | Min, Max | 9, 24 | −8, −2 | 5, 24 | −6, 3 |
| | 95% CI | | −9.68, −0.32 | | −7.22, 1.62 |
| | P value | | 0.0426 | | 0.1538 |
| visit 5 | n(nmiss) | 4(0) | 4(0) | 5(0) | 5(0) |
| | Mean(SD) | 13.8(5.91) | −6.5(3.70) | 16.4(7.54) | −1.4(3.29) |
| | Median | 14.5 | −6.5 | 19.0 | −2.0 |
| | Q1, Q3 | 9.5, 18.0 | −9.0, −4.0 | 19.0, 20.0 | −4.0, −1.0 |
| | Min, Max | 6, 20 | −11, −2 | 3, 21 | −4, 4 |
| | 95% CI | | −12.38, −0.62 | | −5.48, 2.68 |
| | P value | | 0.0390 | | 0.3947 |

[1] The P value is the comparison result of change of each visit from the baseline within the trial group or the control group, and the paired t test is used for the comparison within the group;
[2] Visit 2 (baseline period); Visit 3 (28 days ± 3 days); Visit 4 (56 days ± 3 days); Visit 5 (84 days ± 3 days)

The above results indicate that the cognitive ability of the subjects in the trial group has been improved to a certain extent by maintaining the basic treatment of donepezil hydrochloride and receiving treatment with the phototherapy device for Alzheimer's disease.

In summary, the present invention relates to the following technical solutions:

1. A phototherapy device used for head irradiation, including:
   a near-infrared irradiation module configured for emitting near-infrared light to the head;
   a control component, which is coupled with the near-infrared irradiation module, and configured for controlling the operation of the near-infrared irradiation module.

2. The phototherapy device of item 1, wherein the near-infrared irradiation module emits a predetermined wavelength of near-infrared light, and the control component controls the near-infrared irradiation module to operate in a pulsed light irradiation mode.

3. The phototherapy device of item 2, wherein the pulsed light irradiation mode has a pulse frequency of 1-100 Hz, preferably 8-50 Hz, preferably with a duty cycle of about 50%; preferably, wherein the pulse frequency is 8-12 Hz, preferably 10 Hz; preferably, the pulse frequency is 38-42 Hz, preferably 40 Hz.

4. The phototherapy device of item 2 or 3, wherein the near-infrared irradiation module emits near-infrared light having a central wavelength value of about 700-1200 nm; preferably, wherein the central wavelength of the near-infrared light is about 1020-1120 nm, or preferably about 1070 nm; preferably, the central wavelength of the near-infrared light is about 760-860 nm, preferably about 810 nm.

5. The phototherapy device of item 1, wherein the near-infrared irradiation module comprises multiple light-emitting devices of near-infrared light-emitting diode and/or laser diode emitting multiple wavelengths of near-infrared light.

6. The phototherapy device of item 5, wherein the multiple wavelengths include at least the first wavelength and the second wavelength with a central wavelength value of about 700-1200 nm, preferably, wherein the central wavelength of the first wavelength is 1020-1120 nm, preferably about 1070 nm, preferably, the central wavelength of the second wavelength is about 760-860 nm, preferably about 810 nm.

7. The phototherapy device of item 5, wherein the control component controls the near-infrared irradiation module so that light-emitting diode and/or laser diode emitting different wavelengths operate in a continuous light irradiation mode or pulsed light irradiation mode at the same time.

8. The phototherapy device of item 5, wherein the control component controls the near-infrared irradiation module so that light-emitting diode and/or laser diode emitting different wavelengths operate alternately.

9. The phototherapy device of item 8, wherein light-emitting diode and/or laser diode emitting the same wavelength operate in a continuous light irradiation mode or pulsed light irradiation mode.

10. The phototherapy device of item 7 or 9, wherein the control component controls the near-infrared irradiation module so that light-emitting diode and/or laser diode emitting the first wavelength operate in a pulsed light irradiation mode with a pulse frequency of 1-100 Hz, preferably 8-50 Hz, preferably with a duty cycle of 50%, light-emitting diode and/or laser diode emitting the second wavelength operate in a pulsed light irradiation mode with a pulse frequency of 1-100 Hz, preferably 8-50 Hz, preferably with a duty cycle of 50%, preferably, wherein the pulse frequency of light-emitting diode and/or laser diode emitting the first and second wavelengths is selected from 8-12 Hz and 38-42 Hz, preferably 10 Hz and 40 Hz.

11. The phototherapy device of any one of items 1-10, further comprising a housing adapted to the shape of a human head, wherein the housing comprises a top cover, and a movable component located under the top cover and fixedly connected to the top cover.

12. The phototherapy device of item 11, wherein the phototherapy device includes multiple near-infrared irradiation modules, which are arranged in the top cover and/or the movable component, and the distance between the near-infrared irradiation modules and a user's head is adjusted by the movable component.

13. The phototherapy device of item 12, wherein the near-infrared irradiation modules further comprise a transparent cover covering multiple light-emitting devices of near-infrared light-emitting diode and/or laser diode, and a heat dissipation component.

14. The phototherapy device of item 11, wherein heat dissipation holes are provided on the housing.

15. The phototherapy device of item 11, further comprising an input component for receiving operating parameter input by a user and providing the operating parameter to the control component.

16. The phototherapy device of item 15, wherein the operating parameter includes at least one of irradiation time, irradiation mode, irradiation intensity, and pulse frequency of near-infrared light.

17. The phototherapy device of item 15 or 16, further comprising a console and a mechanical arm arranged on the console, wherein the input component is provided on the console, and the mechanical arm is connected to the housing to control the omnidirectional movement of the housing.

18. The phototherapy device of any one of items 1-17, wherein the phototherapy device is used for treating Alzheimer's disease, improving brain mitochondrial function and ATP level, promoting amyloid beta protein (Aβ) decomposition, reducing Aβ deposition, reducing damage to nerve cells, increasing repair and regeneration abilities of nerve tissues, and improving cognitive ability, etc.

19. The phototherapy device of any one of items 1-18, wherein the phototherapy device is used in combination with anti-Alzheimer's disease drug and/or anti-Alzheimer's disease physical therapy; preferably, wherein the drug is cholinesterase inhibitor or NMDA receptor antagonist; preferably, the drug is donepezil or memantine; preferably, the physical therapy is transcranial electrical therapy, transcranial magnetic stimulation, transcranial electromagnetic stimulation, specific frequency sound therapy.

20. A phototherapy instrument used for head irradiation, comprising:
   a housing adapted to the shape of a human head;
   a near-infrared irradiation module, which is arranged in the housing and configured for emitting near-infrared light to a head;
   a control component, which is coupled with the near-infrared irradiation module, and configured for controlling the operation of the near-infrared irradiation module.

21. The phototherapy instrument of item 20, wherein the housing includes a top cover, and a movable component located under the top cover and fixedly connected to the top cover.

22. The phototherapy instrument of item 21, wherein the phototherapy instrument includes multiple near-infrared irradiation modules, which are arranged in the top cover and/or the movable component, and the distance between the near-infrared irradiation modules and a user's head is adjusted by the movable component.

23. The phototherapy instrument of item 22, wherein the near-infrared irradiation module further includes a transparent cover covering multiple light-emitting devices of near-infrared light-emitting diode and/or laser diode and a heat dissipation component.

24. The phototherapy instrument of item 23, wherein heat dissipation holes are provided on the housing.

25. The phototherapy instrument of any one of items 20-24, further comprising an input component for receiving operating parameter input by a user and providing the operating parameter to the control component.

26. The phototherapy instrument of item 25, wherein the operating parameter includes at least one of irradiation time, irradiation mode, irradiation intensity, and pulse frequency of near-infrared light.

27. The phototherapy instrument of item 25 or 26, further comprising a console and a mechanical arm arranged on the console, wherein the input component is provided on the console, and the mechanical arm is connected to the housing to control the omnidirectional movement of the housing.

28. The phototherapy instrument of any one of items 20-27, wherein the near-infrared irradiation module emits a predetermined wavelength of near-infrared light, and the control component controls the near-infrared irradiation module to operate in a pulsed light irradiation mode.

29. The phototherapy instrument of item 28, wherein the pulsed light irradiation mode has a pulse frequency of 1-100 Hz, preferably 8-50 Hz, preferably with a duty cycle of about 50%; preferably, wherein the pulse frequency is 8-12 Hz, preferably 10 Hz; preferably, the pulse frequency is 38-42 Hz, preferably 40 Hz.

30. The phototherapy instrument of item 28 or 29, wherein the near-infrared irradiation module emits near-infrared light having a central wavelength value of about 700-1200 nm; preferably, wherein the central wavelength of the near-infrared light is about 1020-1120 nm, preferably about 1070 nm; preferably, the central wavelength of the near-infrared light is about 760-860 nm, preferably about 810 nm.

31. The phototherapy instrument of item 30, wherein the near-infrared irradiation module includes multiple light-emitting devices of near-infrared light-emitting diode and/or laser diode emitting multiple wavelengths of near-infrared light.

32. The phototherapy instrument of item 31, wherein the multiple wavelengths include at least the first wavelength and the second wavelength with a central wavelength value of about 700-1200 nm, preferably, wherein the central wavelength of the first wavelength is 1020-1120 nm, preferably about 1070 nm, preferably, the central wavelength of the second wavelength is about 760-860 nm, preferably about 810 nm.

33. The phototherapy instrument of item 31, wherein the control component controls the near-infrared irradiation module so that light-emitting diode and/or laser diode emitting different wavelengths operate in a continuous light irradiation mode or pulsed light irradiation mode at the same time.

34. The phototherapy instrument of item 31, wherein the control component controls the near-infrared irradiation module so that light-emitting diode and/or laser diode emitting different wavelengths operate alternately.

35. The phototherapy instrument of item 34, wherein light-emitting diode and/or laser diode emitting the same wavelength operate in a continuous light irradiation mode or pulsed light irradiation mode.

36. The phototherapy instrument of item 33 or 35, wherein the control component controls the near-infrared irradiation module so that light-emitting diode and/or laser diode emitting the first wavelength operate in a pulsed light irradiation mode with a pulse frequency of 1-100 Hz, preferably 8-50 Hz, preferably with a duty cycle of 50%, light-emitting diode and/or the laser diode emitting the second wavelength operate in a pulsed light irradiation mode with a pulse frequency of 1-100 Hz, preferably 8-50 Hz, preferably with a duty cycle of 50%; preferably, wherein the pulse frequency of light-emitting diode and/or laser diode emitting the first and second wavelengths is selected from 8-12 Hz and 38-42 Hz, preferably 10 Hz and 40 Hz.

37. The phototherapy instrument of any one of items 20-36, wherein the phototherapy instrument is used for treating Alzheimer's disease, improving brain mitochondrial function and ATP level, promoting amyloid beta protein (Aβ) decomposition, reducing Aβ deposition, reducing damage to nerve cells, increasing repair and regeneration abilities of nerve tissues, and improving cognitive ability, etc.

38. The phototherapy instrument of any one of items 20-37, wherein the phototherapy instrument is used in combination with anti-Alzheimer's disease drug and/or anti-Alzheimer's disease physical therapy; preferably, wherein the drug is cholinesterase inhibitor or NMDA receptor antagonist; preferably, the drug is donepezil or memantine; preferably, the physical therapy is transcranial electrical therapy, transcranial magnetic stimulation, transcranial electromagnetic stimulation, specific frequency sound therapy, etc.

39. A method of using near-infrared light to treat diseases, comprising applying the first near-infrared light having a central wavelength of about 700-1200 nm to a patient's head; preferably, wherein the central wavelength of the first near-infrared light is about 1020-1120 nm, preferably about 1070 nm; preferably, the central wavelength of the first near-infrared light is about 760-860 nm, preferably about 810 nm.

40. The method of item 39, further comprising applying the second near-infrared light having a central wavelength of about 700-1200 nm to the patient's head; optionally, wherein the second near-infrared light is applied simultaneously or alternately with the first near-infrared light; preferably, the central wavelengths of the first and second near-infrared lights are selected from about 760-860 nm and 1020-1120 nm, preferably about 810 nm and 1070 nm.

41. The method of item 39 or 40, further comprising applying the third or more near-infrared light having a central wavelength of about 700-1200 nm to the patient's head; optionally, wherein the third or more near-infrared light is applied simultaneously or alternately with the second near-infrared light and/or the first near-infrared light.

42. The method of any one of items 39-41, wherein the first near-infrared light has a pulse frequency of about 1-100 Hz, preferably 8-50 Hz, preferably with a duty cycle of about 50%; preferably, the first near-infrared light has a pulse frequency of about 8-12 Hz; preferably, the first near-infrared light has a pulse frequency of about 10 Hz; preferably, the first near-infrared light has a pulse frequency of about 38-42 Hz; preferably, the first near-infrared light has a pulse frequency of about 40 Hz.

43. The method of any one of items 39-42, wherein the second near-infrared light has a pulse frequency of about 1-100 Hz, preferably 8-50 Hz, preferably with a duty cycle of about 50%; preferably, the second near-infrared light has a pulse frequency of about 38-42 Hz; preferably, the second near-infrared light has a pulse frequency of about 40 Hz; preferably, the second near-infrared light has a pulse frequency of about 8-12 Hz, preferably, the second near-infrared light has a pulse frequency of about 10 Hz.

44. The method of any one of items 39-43, wherein the third or more near-infrared light has a pulse frequency of about 1-100 Hz, preferably 8-50 Hz, preferably with a duty cycle of about 50%.

45. The method of any one of items 39-44, wherein the power density of the applied first, optionally second, optionally third or more near-infrared light is 10 mW/cm2 or more, preferably about 25 mW/cm2.

46. The method of any one of items 39-45, wherein the method is performed using the phototherapy device of any one of items 1-19 or the phototherapy instrument of any one of items 20-38.

47. The method of any one of items 39-46, wherein the method is used for treating Alzheimer's disease, improving brain mitochondrial function and ATP level, promoting amyloid beta protein (Aβ) decomposition, reducing Aβ deposition, reducing damage to nerve cells, increasing repair and regeneration abilities of nerve tissues, improving cognitive ability, etc.

48. The method of any one of items 39-47, wherein the method is used in combination with anti-Alzheimer's disease drug and/or anti-Alzheimer's disease physical therapy; preferably, wherein the drug is cholinesterase inhibitor or NMDA receptor antagonist;

preferably, the drug is donepezil or memantine; preferably, the physical therapy is transcranial electrical therapy, transcranial magnetic stimulation, transcranial electromagnetic stimulation, or specific frequency sound therapy, etc.

49. A method of treating diseases with near-infrared light, comprising applying near-infrared light having a pulse frequency of about 1-100 Hz, preferably 8-50 Hz, to a patient's head; preferably, wherein the near-infrared light has a pulse frequency of about 8-12 Hz; preferably, the near-infrared light has a pulse frequency of about 10 Hz, the near-infrared light has a pulse frequency of about 38-42 Hz; preferably, the near-infrared light has a pulse frequency of about 40 Hz.

50. The method of item 49, wherein the near-infrared light has a duty cycle of about 50%.

51. The method of item 49 or 50, wherein the near-infrared light has a central wavelength of about 700-1200 nm; preferably, wherein the central wavelength of the near-infrared light is about 1020-1120 nm, preferably about 1070 nm; preferably, the central wavelength of the near-infrared light is about 760-860 nm, preferably about 810 nm.

52. The method of any one of items 49-51, comprising applying the second near-infrared light having a pulse frequency of about 1-100 Hz, preferably 8-50 Hz to the patient's head, preferably, wherein the second near-infrared light has a pulse frequency of about 38-42 Hz, preferably, the second near-infrared light has a pulse frequency of about 40 Hz; or the second near-infrared light has a pulse frequency of about 8-12 Hz, preferably, the second near-infrared light has a pulse frequency of about 10 Hz.

53. The method of item 52, wherein the near-infrared light has a duty cycle of about 50%.

54. The method of any one of items 52-53, wherein the near-infrared light has a central wavelength of about 700-1200 nm; optionally, the second near-infrared light is applied simultaneously or alternately with the first near-infrared light; preferably, the central wavelengths of the first and second near-infrared lights are selected from about 760-860 nm and 1020-1120 nm, preferably about 810 nm and 1070 nm.

55. The method of any one of items 49-54, further comprising applying the third or more near-infrared light having a pulse frequency of about 1-100 Hz, preferably 8-50 Hz, to the patient's head; preferably, wherein the near-infrared light has a duty cycle of about 50%; preferably, the near-infrared light has a central wavelength of about 700-1200 nm; optionally, the third or more near-infrared light is applied simultaneously or alternately with the second near-infrared light and/or the first near-infrared light.

56. The method of any one of items 49-55, wherein the power density of the applied near-infrared light is about 10 mW/cm2 or more, preferably about 25 mW/cm2.

57. The method of any one of items 49-56, wherein the method is performed using the phototherapy device of any one of items 1-19 or the phototherapy instrument of any one of items 20-38.

58. The method of any one of items 49-57, wherein the method is used for treating Alzheimer's disease, improving brain mitochondrial function and ATP level, promoting amyloid beta protein (Aβ) decomposition, reducing Aβ deposition, reducing damage to nerve cells, increasing repair and regeneration abilities of nerve tissues, improving cognitive ability, etc.

59. The method of any one of items 49-58, wherein the method is used in combination with anti-Alzheimer's disease drug and/or anti-Alzheimer's disease physical therapy; preferably, wherein the drug is cholinesterase inhibitor or NMDA receptor antagonist; preferably, the drug is donepezil or memantine; preferably, the physical therapy is transcranial electrical therapy, transcranial magnetic stimulation, transcranial electromagnetic stimulation, specific frequency sound therapy, etc.

60. A method for treatment, comprising administering anti-Alzheimer's disease drug and/or anti-Alzheimer's disease physical therapy to a patient, and applying near-infrared light to the patient's head.

61. The method of item 60, wherein the near-infrared light has a central wavelength of about 700-1200 nm; preferably, the central wavelength of the near-infrared light is about 1020-1120 nm, preferably about 1070 nm; preferably, the central wavelength of the near-infrared light is about 760-860 nm, preferably about 810 nm.

62. The method of item 60 or 61, further comprising applying the second near-infrared light having a central wavelength of about 700-1200 nm to the patient's head; optionally, wherein the second near-infrared light is applied simultaneously or alternately with the first near-infrared light; preferably, the central wavelengths of the first and second near-infrared lights are selected from about 760-860 nm and 1020-1120 nm, preferably about 810 nm and 1070 nm.

63. The method of any one of items 60-62, further comprising applying the third or more near-infrared light having a central wavelength of about 700-1200 nm to the patient's head; optionally, wherein the third or more near-infrared light is applied simultaneously or alternately with the second near-infrared light and/or the first near-infrared light.

64. The method of any one of items 60-63, wherein the first near-infrared light has a pulse frequency of about 1-100 Hz, preferably 8-50 Hz, preferably with a duty cycle of about 50%; preferably, the first near-infrared light has a pulse frequency of about 8-12 Hz; preferably, the first near-infrared light has a pulse frequency of about 10 Hz; or the first near-infrared light has a pulse frequency of about 38-42 Hz; preferably, the second near-infrared light has a pulse frequency of about 40 Hz.

65. The method of any one of items 60-64, wherein the second near-infrared light has a pulse frequency of about 1-100 Hz, preferably 8-50 Hz, preferably with a duty cycle of about 50%; preferably, the second near-infrared light has a pulse frequency of about 38-42 Hz; preferably, the second near-infrared light has a pulse frequency of about 40 Hz; preferably, the second near-infrared light has a pulse frequency of about 8-12 Hz; preferably, the first near-infrared light has a pulse frequency of about 10 Hz.

66. The method of any one of items 60-65, wherein the third near-infrared light has a pulse frequency of about 1-100 Hz, preferably 8-50 Hz, preferably with a duty cycle of about 50%.

67. The method of any one of items 60-66, wherein the power density of the applied near-infrared light is about 10 mW/cm2 or more, preferably about 25 mW/cm2.

68. The method of any one of items 60-67, wherein the method is performed using the phototherapy device of any one of items 1-19 or the phototherapy instrument of any one of items 20-38.

69. The method of any one of items 60-68, wherein the method is used for treating Alzheimer's disease, improving brain mitochondrial function and ATP level, promoting amyloid beta protein (Aβ) decomposition, reducing Aβ deposition, reducing damage to nerve cells, increasing repair and regeneration abilities of nerve tissues, improving cognitive ability, etc.

70. The method of any one of items 60-69, wherein the drug is cholinesterase inhibitor or NMDA receptor antagonist; preferably, wherein the drug is donepezil or memantine; preferably, the physical therapy is transcranial electrical therapy, transcranial magnetic stimulation, transcranial electromagnetic stimulation, specific frequency sound therapy, etc.

71. A method for treatment, comprising administering anti-Alzheimer's disease drug and/or anti-Alzheimer's disease physical therapy to a patient, and applying near-infrared light to the patient's head.

72. The method of item 71, wherein the near-infrared light has a pulse frequency of about 1-100 Hz, preferably 8-50 Hz; preferably, the near-infrared light has a pulse frequency of about 8-12 Hz; preferably, the near-infrared light has a pulse frequency of about 10 Hz; preferably, the near-infrared light has a pulse frequency of about 38-42 Hz; preferably, the near-infrared light has a pulse frequency of about 40 Hz.

73. The method of item 71 or 72, wherein the near-infrared light has a duty cycle of about 50%.

74. The method of any one of items 71-73, wherein the near-infrared light has a central wavelength of about 700-1200 nm; preferably, the central wavelength of the near-infrared light is about 1020-1120 nm, preferably about 1070 nm; preferably, the central wavelength of the near-infrared light is about 760-860 nm, preferably about 810 nm.

75. The method of any one of items 71-74, further comprising applying the second near-infrared light having a pulse frequency of about 1-100 Hz, preferably 8-50 Hz to the patient's head; preferably, wherein the near-infrared light has a pulse frequency of about 38-42 Hz; preferably, the near-infrared light has a pulse frequency of about 40 Hz; preferably, the near-infrared light has a pulse frequency of about 8-12 Hz; preferably, the near-infrared light has a pulse frequency of about 10 Hz.

76. The method of item 75, wherein the near-infrared light has a duty cycle of about 50%.

77. The method of item 75 or 76, wherein the near-infrared light has a central wavelength of about 700-1200 nm; preferably, the central wavelengths of the first and second near-infrared lights are selected from about 760-860 nm and 1020-1120 nm, preferably about 810 nm and 1070 nm.

78. The method of any one of items 71-77, further comprising applying the third or more near-infrared light having a pulse frequency of about 1-100 Hz, preferably 8-50 Hz to the patient's head; preferably, wherein the near-infrared light has a duty cycle of about 50%; preferably, the near-infrared light has a central wavelength of about 700-1200 nm; optionally, the third or more near-infrared light is applied simultaneously or alternately with the second near-infrared light and/or the first near-infrared light.

79. The method of any one of items 71-78, wherein the power density of the applied near-infrared light is about 10 mW/cm2 or more, preferably about 25 mW/cm2.

80. The method of any one of items 71-79, wherein the method is performed using the phototherapy device of any one of items 1-19 or the phototherapy instrument of any one of items 20-38.

81. The method of any one of items 71-80, wherein the method is used for treating Alzheimer's disease, improving brain mitochondrial function and ATP level, promoting amyloid beta protein (Aβ) decomposition, reducing Aβ deposition, reducing damage to nerve cells, increasing repair and regeneration abilities of nerve tissues, improving cognitive ability, etc.

82. The method of any one of items 71-81, wherein the drug is cholinesterase inhibitor or NMDA receptor antagonist; preferably, the drug is donepezil or memantine; preferably, the physical therapy is transcranial electrical therapy, transcranial magnetic stimulation, transcranial electromagnetic stimulation, specific frequency sound therapy, etc.

83. A computer readable recording medium, on which is recorded an executable code segment, which is used to achieve the following function when executed: controlling multiple light-emitting devices of near-infrared light-emitting diode and/or laser diode to apply the first near-infrared light having a central wavelength of about 700-1200 nm to a patient's head;

preferably, wherein the central wavelength of the first near-infrared light is about 1020-1120 nm, preferably about 1070 nm; preferably, the central wavelength of the first near-infrared light is about 760-860 nm, preferably about 810 nm.

84. The recording medium of item 83, wherein the code segment is also used to achieve the following function when executed: controlling multiple light-emitting devices of near-infrared light-emitting diode and/or laser diode to apply the second near-infrared light having a central wavelength of about 700-1200 nm to the patient's head, wherein the second near-infrared light is applied simultaneously or alternately with the first near-infrared light; preferably, the central wavelengths of the first and second near-infrared lights are selected from about 760-860 nm and 1020-1120 nm, preferably about 810 nm and 1070 nm.

85. The recording medium of item 83 or 84, wherein the code segment is also used to achieve the following function when executed: controlling multiple light-emitting devices of near-infrared light-emitting diode and/or laser diode to apply the third or more near-infrared light having a central wavelength of about 700-1200 nm to the patient's head, wherein the third or more near-infrared light is applied simultaneously or alternately with the second near-infrared light and/or the first near-infrared light.

86. The recording medium of item 83, wherein the first, second, and third near-infrared lights have a pulse frequency of about 1-100 Hz, preferably 8-50 Hz; preferably, the first, second, and third or more near-infrared lights have a pulse frequency of about 8-12 Hz; preferably, the first, second, and third or more near-infrared lights have a pulse frequency of about 10 Hz; preferably, the first, second, and third or more near-infrared lights have a pulse frequency of about 38-42 Hz; preferably, the first, second, and third or more near-infrared lights have a pulse frequency of about 40 Hz.

87. The recording medium of item 86, wherein the applied first, second, third or more near-infrared light has a duty cycle of about 50%.

88. The recording medium of any one of items 83-87, wherein the power density of the applied first, second, third or more near-infrared light is about 10 mW/cm2 or more, preferably about 25 mW/cm2.

89. A computer readable recording medium, on which is recorded an executable code segment, which is used to achieve the following function when executed: controlling multiple light-emitting devices of near-infrared light-emitting diode and/or laser diode to apply near-infrared light having a pulse frequency of about 1-100 Hz, preferably 8-50 Hz to a patient's head; preferably, wherein the near-infrared light has a pulse frequency of about 8-12 Hz; preferably, the near-infrared light has a pulse frequency of about 10 Hz; preferably, the near-infrared light has a pulse frequency of about 38-42 Hz; preferably, the near-infrared light has a pulse frequency of about 40 Hz.

90. The recording medium of item 89, wherein the near-infrared light has a duty cycle of about 50%.

91. The recording medium of item 89 or 90, wherein the near-infrared light has a central wavelength of about 700-1200 nm; preferably, wherein the central wavelength of the near-infrared light is about 1020-1120 nm, preferably about 1070 nm; preferably, the central wavelength of the near-infrared light is about 760-860 nm, preferably about 810 nm; preferably, the central wavelength of the near-infrared light is about 1020-1120 nm, preferably about 1070 nm.

92. The recording medium of item 89, wherein the code segment is also used to achieve the following function when executed: applying the second near-infrared light having a pulse frequency of about 1-100 Hz, preferably 8-50 Hz to the patient's head, wherein the second near-infrared light is applied simultaneously or alternately with the first near-infrared light; preferably, wherein the second near-infrared light has a pulse frequency of about 38-42 Hz; preferably, the second near-infrared light has a pulse frequency of about 40 Hz; preferably, the second near-infrared light has a pulse frequency of about 8-12 Hz; preferably, the second near-infrared light has a pulse frequency of about 10 Hz.

93. The recording medium of item 92, wherein the near-infrared light has a duty cycle of about 50%.

94. The recording medium of item 92 or 93, wherein the second near-infrared light has a central wavelength of about 700-1200 nm; preferably, wherein the central wavelengths of the first and second near-infrared lights are selected from about 760-860 nm and 1020-1120 nm, preferably about 810 nm and 1070 nm.

95. The recording medium of item 92, wherein the code segment is also used to achieve the following function when executed: applying the third or more near-infrared light having a pulse frequency of about 1-100 Hz, preferably 8-50 Hz to the patient's head; wherein the near-infrared light has a duty cycle of about 50%; the near-infrared light has a central wavelength of about 700-1200 nm; the third or more near-infrared light is applied simultaneously or alternately with the second near-infrared light and/or the first near-infrared light.

96. The recording medium of any one of items 89-95, wherein the power density of the applied near-infrared light is about 10 mW/cm2 or more, preferably about 25 mW/cm2.

In addition, the phototherapy device, phototherapy instrument, and method for treatment according to the present invention can also be implemented by providing a computer program product containing program code for implementing the method or device, or by any storage medium storing such computer program product.

The above describes the basic principles of the present invention in combination with specific embodiments. However, it should be pointed out that the advantages, advantages, effects, etc. mentioned in the present invention are only examples and not limitations, and these advantages, advantages, effects, etc. cannot be considered as Required for each embodiment of the present invention. In addition, the specific details disclosed above are only for illustrative purposes and easy-to-understand functions, rather than limitation, and the above details do not limit the present invention to that the above specific details must be used for implementation.

The block diagrams of the devices, devices, equipment, and systems involved in the present invention are merely illustrative examples and are not intended to require or imply that they must be connected, arranged, and configured in the manner shown in the block diagrams. As those skilled in the art will recognize, these devices, devices, equipment, and systems can be connected, arranged, and configured in any manner. Words such as "include", "include", "have", etc. are open vocabulary and mean "including but not limited to" and can be used interchangeably. The terms "or" and "and" as used herein refer to the terms "and/or" and can be used interchangeably, unless the context clearly indicates otherwise. The term "such as" used herein refers to the phrase "such as but not limited to" and can be used interchangeably with it.

In addition, as used herein, the use of "or" in a listing of items beginning with "at least one" indicates a separate listing, so that, for example, a listing of "at least one of A, B, or C" means A or B or C, or AB or AC or BC, or ABC (ie A and B and C). In addition, the word "exemplary" does not mean that the described example is preferred or better than other examples.

When the term "about" is used in the indicated numerical value or numerical range, it means that the index value or numerical range is an approximation within the experimental difference (or within the statistical experimental error), so the numerical value or numerical range can be within the stated value or numerical value. The range varies between +5 for example.

It should also be pointed out that in the device and method of the present invention, each component or each step can be decomposed and/or recombined. These decompositions and/or recombination should be regarded as equivalent solutions of the present invention.

Those of ordinary skill in the art could understand that all or any part of the method and device of the present invention can be implemented through hardware, firmware, software, or a combination thereof in any computing device (comprising a processor, storage medium, etc.) or a network of computing devices. The hardware may be a general processor, digital signal processor (DSP), ASIC, field programmable gate array signal (FPGA) or other programmable logic device (PLD), discrete gate or transistor logic, discrete hardware component, or any combination thereof designed to perform the functions described herein.

The general processor may be a microprocessor, but as an alternative, the processor may be any commercially available processor, controller, microcontroller, or state machine. The processor may also be implemented as a combination of computing devices, such as a combination of a DSP and a microprocessor, multiple microprocessors, one or more microprocessors cooperating with DSP core, or any other such configurations. The software may exist in any form of computer-readable tangible storage medium. By way of embodiment but not limitation, such computer-readable tangible storage medium may include RAM, ROM, EEPROM, CD-ROM or other optical disk storage, disk storage, or other magnetic storage device, or any other tangible medium that can be used to carry or store the desired program code in the form of instructions or data structures and that can be accessed by a computer. As used herein, the disks include compact disk (CD), laser disc, compact disc, digital versatile disc (DVD), floppy disc, and blu-ray disc.

Various changes, substitutions, and alterations to the technology described herein can be made without departing from the technology taught by the appended claims. In addition, the scope of the claims of the present invention is not limited to the specific aspects of the processing, machine, manufacturing, event composition, means, methods, and actions described above. The composition, means, method, or action of a process, machine, manufacturing, event that currently exists or will be developed later can be utilized to perform substantially the same function or achieve substantially the same result as the corresponding aspect described herein. Therefore, the appended claims include such processing, machine, manufacturing, event composition, means, methods or actions within its scope.

The above description of the disclosed aspects is provided to enable any person skilled in the art to make or use the present invention. Various modifications to these aspects are very obvious to those skilled in the art, and the general principles defined herein can be applied to other aspects without departing from the scope of the present invention. Therefore, the present invention is not intended to be limited to the aspects shown here, but in accordance with the widest scope consistent with the principles and novel features disclosed herein.

The above description has been provided for the purpose of illustration and description. In addition, the description is not intended to limit the embodiments of the present invention to the form disclosed herein. Although a number of exemplary aspects and embodiments have been discussed above, those skilled in the art will recognize some variants, modifications, changes, additions and sub-combinations thereof.

What is claimed is:

1. A method of treating Alzheimer's disease, the method comprising providing a helmet-type phototherapy device for head irradiation, the helmet-type phototherapy device, including:
    a near-infrared irradiation module configured for emitting near-infrared light to the head, wherein the near-infrared irradiation module includes multiple light-emitting devices of near-infrared light-emitting diode and/or laser diode; and
    a control component, coupled with the near-infrared irradiation module and configured for controlling operation of the near-infrared irradiation module, wherein the control component controls the near-infrared irradiation module to operate in a pulsed light irradiation mode;

applying a first near-infrared light having a central wavelength of 1020-1120 nm to the head of a subject; and applying a second near-infrared light having a central wavelength of 760-860 nm to the head of the subject;

wherein the second near-infrared light is applied simultaneously or alternately with the first near-infrared light, and wherein the first near-infrared light and the second near-infrared light are applied at a pulse frequency of 8-12 Hz with a duty cycle of 50%.

2. The method of treating Alzheimer's disease of claim 1, wherein the pulse frequency is 10 Hz.

3. The method of treating Alzheimer's disease of claim 1, wherein the central wavelength of the first near-infrared light is 1070 nm±20 nm.

4. The method of treating Alzheimer's disease of claim 1, wherein the central wavelength of the second near-infrared light is 810 nm±20 nm.

5. The method of treating Alzheimer's disease of claim 1, wherein the helmet-type phototherapy device further includes a housing adapted to the shape of a human's head, wherein the housing includes a top cover, and a movable component located under the top cover and fixedly connected to the top cover.

6. The method of treating Alzheimer's disease of claim 5, wherein the helmet-type phototherapy device includes multiple near-infrared irradiation modules, which are arranged in the top cover and/or the movable component, and a distance between the infrared irradiation modules and a user's head is adjusted by the movable component.

7. The method of treating Alzheimer's disease of claim 6, wherein the near-infrared irradiation module further includes a transparent cover covering multiple light-emitting devices of near-infrared light-emitting diode and/or laser diode, and a heat dissipation component.

8. The method of treating Alzheimer's disease of claim 5, wherein the housing is provided with heat dissipation holes.

9. The method of treating Alzheimer's disease of claim 5, wherein the helmet-type phototherapy device further includes an input component for receiving an operating parameter input by a user and providing the operating parameter to the control component.

10. The method of treating Alzheimer's disease of claim 9, wherein the operating parameter includes at least one of irradiation time, irradiation mode, irradiation intensity, and pulse frequency of the near-infrared light.

11. The method of treating Alzheimer's disease of claim 9, wherein the helmet-type phototherapy device further includes a console and a mechanical arm arranged on the console, wherein the input component is configured on the console, and the mechanical arm is connected to the housing to control omnidirectional movement of the housing.

12. The method of treating Alzheimer's disease of claim 1, further comprising administering to the subject an anti-Alzheimer's disease drug and/or anti-Alzheimer's disease physical therapy.

13. The method of treating Alzheimer's disease of claim 12, wherein the drug is cholinesterase inhibitor, NMDA receptor antagonist, donepezil, or memantine.

14. The method of treating Alzheimer's disease of claim 12, wherein the physical therapy is transcranial electrical therapy, transcranial magnetic stimulation, transcranial electromagnetic stimulation, or specific frequency sound therapy.

15. A method of treating Alzheimer's disease, the method comprising providing a phototherapy device for head irradiation, the phototherapy device, comprising:

a near-infrared irradiation module configured for emitting near-infrared light to the head, wherein the near-infrared irradiation module includes multiple light-emitting devices of near-infrared light-emitting diode and/or laser diode, comprising a first light-emitting device which emits a first near-infrared light at a first wavelength with a central wavelength of 1020-1120 nm and a second light-emitting device which emits a second near-infrared light at a second wavelength with a central wavelength of 760-860 nm, and a control component, coupled with the near-infrared irradiation module and configured for controlling operation of the near-infrared irradiation module;

applying the first near-infrared light to the head of a subject; and applying the second near-infrared light to the head of the subject, wherein the second near-infrared light is applied simultaneously or alternately with the first near-infrared light.

16. The method of treating Alzheimer's disease of claim 15, wherein the central wavelength of the first near-infrared light is 1070 nm±20 nm.

17. The method of treating Alzheimer's disease of claim 15, wherein the central wavelength of the second near-infrared light is 810 nm±20 nm.

18. The method of treating Alzheimer's disease of claim 15, wherein the multiple light-emitting devices of near-infrared light-emitting diode and/or laser diode comprise a third or more light-emitting device which emits a third or more near-infrared light at a third wavelength with a central wavelength of 700-1120 nm, and wherein the method further comprises applying the third or more near-infrared lights to the head of the subject, wherein the third or more near-infrared lights are applied simultaneously or alternately with the second near-infrared light and/or the first near-infrared light.

19. The method of treating Alzheimer's disease of claim 18, wherein the third or more near-infrared lights have a pulse frequency of 8-12 Hz.

20. The method of treating Alzheimer's disease of claim 19, wherein the first, second, and third or more near-infrared lights have a pulse frequency of 10 Hz.

21. The method of treating Alzheimer's disease of claim 18, wherein the third or more near-infrared lights have a duty cycle of 50%.

22. The method of treating Alzheimer's disease of claim 18, wherein the power densities of the first, second, and third or more near-infrared lights are greater than or equal to 10 mW/cm$^2$.

23. The method of treating Alzheimer's disease of claim 22, wherein the power densities of the first, second, and third or more near-infrared lights are 25 mW/cm$^2$.

24. The method of treating Alzheimer's disease of claim 22, wherein the first, second, and third or more near-infrared lights have a pulse frequency of 38-42 Hz.

25. The method of treating Alzheimer's disease of claim 24, wherein the first, second, and third or more near-infrared lights have a pulse frequency of 40 Hz.

26. The method of treating Alzheimer's disease of claim 15, wherein the first and second near-infrared lights have a pulse frequency of 8-12 Hz with a duty cycle of 50%.

* * * * *